(12) United States Patent
Ingersoll et al.

(10) Patent No.: US 8,567,303 B2
(45) Date of Patent: Oct. 29, 2013

(54) COMPRESSOR AND/OR EXPANDER DEVICE WITH ROLLING PISTON SEAL

(75) Inventors: Eric D. Ingersoll, Cambridge, MA (US); Justin A. Aborn, Hingham, MA (US); Matthew Blieske, Francestown, NH (US); Istvan Hauer, Jamaica Plain, MA (US)

(73) Assignee: General Compression, Inc., Newton, MA (US)

( * ) Notice: Subject to any disclaimer, the term of this patent is extended or adjusted under 35 U.S.C. 154(b) by 0 days.

(21) Appl. No.: 13/312,467

(22) Filed: Dec. 6, 2011

(65) Prior Publication Data

US 2012/0073432 A1    Mar. 29, 2012

Related U.S. Application Data

(60) Provisional application No. 61/420,505, filed on Dec. 7, 2010.

(51) Int. Cl.
*F16J 3/00*    (2006.01)
*F02G 1/00*    (2006.01)

(52) U.S. Cl.
USPC .............................................. 92/98 D; 92/99

(58) Field of Classification Search
USPC .................................... 92/98 D, 99
See application file for complete search history.

(56) References Cited

U.S. PATENT DOCUMENTS

| 37,258 A | 12/1862 | Miller |
|---|---|---|
| 114,297 A | 5/1871 | Ivens et al. |
| 224,081 A | 2/1880 | Eckart |
| 233,432 A | 10/1880 | Pitchford |
| 320,482 A | 6/1885 | Leavitt |
| 874,140 A | 12/1907 | Valiquet |
| 943,000 A | 12/1909 | Busby |
| 1,045,961 A | 12/1912 | Ferranti |

(Continued)

FOREIGN PATENT DOCUMENTS

| DE | 2218082 | 10/1973 |
|---|---|---|
| DE | 3128539 | 2/1983 |

(Continued)

OTHER PUBLICATIONS

Cyphelly et al., "Usage of Compressed Air Storage Systems," Program Elektricity, Final Report May 2004, Ordered by the Swiss Federal Office of Energy.

(Continued)

*Primary Examiner* — Thomas E Lazo
(74) *Attorney, Agent, or Firm* — Goodwin Procter LLP

(57) ABSTRACT

An apparatus can include a piston movably disposed within a pressure vessel and defines a first interior region and a second interior region. The piston has a first position in which the first interior contains a gas having a first pressure and has a volume greater than the second interior region, and a second position in which the second interior region contains a gas having a second pressure and has a volume greater than the first interior region. A seal member is attached to the piston and to the pressure vessel. The seal member has a first configuration in which at least a portion of the seal member is disposed at a first position when the piston is in its first position, and a second configuration in which the portion of the seal member is disposed at a second position when the piston is in its second position.

19 Claims, 21 Drawing Sheets

(56) References Cited

U.S. PATENT DOCUMENTS

| | | |
|---|---|---|
| 1,147,204 A | 7/1915 | Anheuser |
| 1,230,028 A | 6/1917 | Rardon |
| 1,353,216 A | 9/1920 | Carlson |
| 1,369,596 A | 2/1921 | Yanacopoulos |
| 1,635,524 A | 7/1927 | Aikman |
| 1,681,280 A | 8/1928 | Bruckner |
| 1,918,789 A | 7/1933 | Ttisworth |
| 1,947,304 A | 2/1934 | Morro |
| 2,005,515 A | 6/1935 | Winkler |
| 2,025,142 A | 12/1935 | Zahm et al. |
| 2,042,991 A | 6/1936 | Harris, Jr. |
| 2,141,703 A | 12/1938 | Bays |
| 2,150,122 A | 3/1939 | Kollberg et al. |
| 2,280,100 A | 4/1942 | Singleton |
| 2,280,845 A | 4/1942 | Parker |
| 2,339,086 A | 8/1944 | Makaroff |
| 2,404,660 A | 7/1946 | Rouleau |
| 2,420,098 A | 5/1947 | Rouleau |
| 2,454,058 A | 11/1948 | Hays |
| 2,479,856 A | 8/1949 | Mitton |
| 2,539,862 A | 1/1951 | Rushing |
| 2,628,564 A | 2/1953 | Jacobs |
| 2,683,964 A | 7/1954 | Anxionnaz et al. |
| 2,706,077 A | 4/1955 | Searcy |
| 2,712,728 A | 7/1955 | Lewis et al. |
| 2,813,398 A | 11/1957 | Wilcox |
| 2,824,687 A | 2/1958 | Osterkamp |
| 2,829,501 A | 4/1958 | Walls |
| 2,880,759 A | 4/1959 | Wisman |
| 2,898,183 A | 8/1959 | Fauser |
| 3,014,639 A | 12/1961 | Boli |
| 3,041,842 A | 7/1962 | Heinecke |
| 3,232,524 A | 2/1966 | Rice at al. |
| 3,236,512 A | 2/1966 | Caslav et al. |
| 3,269,121 A | 8/1966 | Ludwig |
| 3,355,096 A | 11/1967 | Hornschuch |
| 3,373,694 A * | 3/1968 | Taplin ............ 92/98 D |
| 3,435,733 A * | 4/1969 | Kurt ............... 92/98 R |
| 3,523,192 A | 8/1970 | Lang |
| 3,530,681 A | 9/1970 | Dehne |
| 3,538,340 A | 11/1970 | Lang |
| 3,608,311 A | 9/1971 | Roesel, Jr. |
| 3,618,470 A | 11/1971 | Mueller et al. |
| 3,633,663 A | 1/1972 | Tafel |
| 3,648,458 A | 3/1972 | McAlister |
| 3,650,636 A | 3/1972 | Eskeli |
| 3,672,160 A | 6/1972 | Kim |
| 3,673,927 A * | 7/1972 | Fluhr ............. 92/98 D |
| 3,677,008 A | 7/1972 | Koutz |
| 3,704,079 A | 11/1972 | Berlyn |
| 3,757,517 A | 9/1973 | Rigollot |
| 3,783,745 A * | 1/1974 | Meijer et al. ......... 92/98 D |
| 3,792,643 A | 2/1974 | Scheafer |
| 3,793,848 A | 2/1974 | Eskeli |
| 3,796,044 A | 3/1974 | Schwarz |
| 3,801,793 A | 4/1974 | Goebel |
| 3,802,795 A | 4/1974 | Nyeste |
| 3,803,847 A | 4/1974 | McAlister |
| 3,806,733 A | 4/1974 | Haanen |
| 3,818,801 A | 6/1974 | Kime |
| 3,832,851 A | 9/1974 | Kiernan |
| 3,835,918 A | 9/1974 | Pilarczyk |
| 3,839,863 A | 10/1974 | Frazier |
| 3,847,182 A | 11/1974 | Greer |
| 3,854,301 A | 12/1974 | Cytryn |
| 3,895,493 A | 7/1975 | Rigollot |
| 3,903,696 A | 9/1975 | Carman |
| 3,934,480 A * | 1/1976 | Nederlof ............ 92/98 D |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,968,732 A | 7/1976 | Fitzgerald |
| 3,974,849 A * | 8/1976 | Dawson ............ 92/98 D |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,009,587 A | 3/1977 | Robinson, Jr. et al. |
| 4,024,770 A * | 5/1977 | Liesenborghs ............ 92/98 D |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,053,395 A | 10/1977 | Switzgable |
| 4,055,950 A | 11/1977 | Grossman |
| 4,058,979 A | 11/1977 | Germain |
| 4,079,586 A | 3/1978 | Kincaid, Jr. |
| 4,079,591 A | 3/1978 | Derby |
| 4,089,744 A | 5/1978 | Cahn |
| 4,090,940 A | 5/1978 | Switzgable |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,343 A | 9/1978 | Hoffelns |
| 4,117,696 A | 10/1978 | Fawcett et al. |
| 4,118,637 A | 10/1978 | Tackett |
| 4,124,182 A | 11/1978 | Loeb |
| 4,124,805 A | 11/1978 | Jacoby |
| 4,126,000 A | 11/1978 | Funk |
| 4,136,432 A | 1/1979 | Melley, Jr. |
| 4,137,015 A | 1/1979 | Grossman |
| 4,142,368 A | 3/1979 | Mantegani |
| 4,143,522 A | 3/1979 | Hamrick |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,601 A | 6/1980 | Eberle |
| 4,206,608 A | 6/1980 | Bell |
| 4,209,982 A | 7/1980 | Pitts |
| 4,215,548 A | 8/1980 | Beremand |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,236,083 A | 11/1980 | Kenney |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege et al. |
| 4,265,599 A | 5/1981 | Morton |
| 4,273,514 A | 6/1981 | Shore et al. |
| 4,274,010 A | 6/1981 | Lawson-Tancred |
| 4,275,310 A | 6/1981 | Summers et al. |
| 4,281,256 A | 7/1981 | Ahrens |
| 4,281,589 A * | 8/1981 | Stoll ............ 92/98 D |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |

(56) References Cited

U.S. PATENT DOCUMENTS

| | | |
|---|---|---|
| 4,311,011 A | 1/1982 | Lewis |
| 4,316,096 A | 2/1982 | Syverson |
| 4,317,439 A | 3/1982 | Emmerling |
| 4,329,842 A | 5/1982 | Hoskinson |
| 4,335,093 A | 6/1982 | Salomon |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,362,462 A | 12/1982 | Blotenberg |
| 4,363,703 A | 12/1982 | ElDifrawi |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,372,332 A | 2/1983 | Mast |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,426,846 A | 1/1984 | Bailey |
| 4,428,711 A | 1/1984 | Archer |
| 4,435,131 A | 3/1984 | Ruben |
| 4,466,244 A | 8/1984 | Wu |
| 4,478,556 A | 10/1984 | Gozzi |
| 4,537,558 A | 8/1985 | Tsunoda et al. |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,741,252 A * | 5/1988 | Harter et al. .......... 92/98 D |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,887,516 A * | 12/1989 | Scott et al. ............ 92/98 D |
| 4,915,018 A * | 4/1990 | Scott et al. ............ 92/98 D |
| 4,959,958 A | 10/1990 | Nishikawa et al. |
| 5,090,299 A * | 2/1992 | Santi et al. ............. 92/98 D |
| 5,099,648 A | 3/1992 | Angle |
| 5,138,936 A * | 8/1992 | Kent ........................ 92/98 D |
| 5,142,870 A | 9/1992 | Angle |
| 5,161,865 A | 11/1992 | Higashimata et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,275,014 A * | 1/1994 | Solomon ................. 92/98 D |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| 6,266,959 B1 | 7/2001 | Markwart |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,418,970 B1 | 7/2002 | Deul |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,986,499 B2 | 1/2006 | Davis et al. |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,013,639 B2 | 3/2006 | Hamman |
| 7,021,602 B2 | 4/2006 | Davis et al. |
| RE39,249 E | 8/2006 | Link, Jr. |
| 7,104,052 B1 | 9/2006 | Hindman |
| 7,210,496 B2 | 5/2007 | Suzuki |
| 7,219,682 B2 | 5/2007 | Agnew et al. |
| 7,246,491 B2 | 7/2007 | Yamaguchi |
| 7,255,126 B2 | 8/2007 | Arlinghaus |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 2003/0180155 A1 | 9/2003 | Coney et al. |
| 2005/0056318 A1 | 3/2005 | Arlinghaus |
| 2005/0180864 A1 | 8/2005 | Ursan et al. |
| 2006/0078445 A1 | 4/2006 | Carter, III et al. |
| 2006/0218908 A1 | 10/2006 | Abou-Raphael |
| 2006/0248886 A1 | 11/2006 | Ma |
| 2007/0187918 A1 | 8/2007 | Mizuno |
| 2008/0060862 A1 | 3/2008 | Schlele et al. |
| 2008/0163618 A1 | 7/2008 | Paul |
| 2009/0084102 A1 | 4/2009 | Mueller |
| 2009/0226331 A1 | 9/2009 | Sieber |
| 2009/0260361 A1 | 10/2009 | Prueitt |
| 2009/0282822 A1 | 11/2009 | McBride et al. |
| 2009/0301089 A1 | 12/2009 | Bollinger |
| 2010/0018196 A1 | 1/2010 | Li et al. |

(56) References Cited

U.S. PATENT DOCUMENTS

| | | |
|---|---|---|
| 2010/0089062 A1 | 4/2010 | Cao |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |

FOREIGN PATENT DOCUMENTS

| | | | |
|---|---|---|---|
| DE | 3128539 A | * | 2/1983 |
| DE | 4427148 | | 2/1996 |
| DE | 19711984 | | 9/1998 |
| DE | 102004012130 | | 9/2005 |
| EP | 0812990 | | 12/1997 |
| FR | 1168581 | | 12/1958 |
| GB | 2013318 | | 8/1979 |
| JP | 55064531 | | 5/1980 |
| JP | H01113601 | | 7/1989 |
| WO | WO 90/03516 | | 4/1990 |
| WO | WO 93/06367 | | 4/1993 |
| WO | WO 98/17492 | | 4/1998 |
| WO | WO 2005/069847 | | 8/2005 |
| WO | WO 2008/139267 | | 11/2008 |
| WO | WO 2009/034548 | | 3/2009 |
| WO | WO 2010/135658 | | 11/2010 |
| WO | WO 2011/079267 | | 6/2011 |
| WO | WO 2011/079271 | | 6/2011 |

OTHER PUBLICATIONS

Kartsounes, "Preliminary Evaluation of a New IC Expander; Compressor Engine for Use in Compressed Air Energy Storage Plants", Informal Report, Argonne National Laboratory, Oct. 1977, 38 pages.

Kartsounes et al, "Evaluation of the Use of Reciprocating Engines in Compressed Air Energy Storage Plants", Proceedings of the 1978 Mechanical and Magnetic Energy Storage Contractors' Review Meeting, U.S. Department of Energy, Oct. 1978, 10 pages.

Symposium Steering Committee, Compressed Air Energy Storage Symposium Proceedings, May 1978, Pacific Grove, CA, Pacific Northwest Laboartory, 40 pages.

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978 May 15-17, 1978, Pacific Grove CA Argonne National Laboratory Argonne Illinois 24 pages.

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15.

Carbon Trust, "Hydraulic Transmission System for Large Wind Turbines," Jan. 2007, 1 page.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 13 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute 50 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.

"Swash-plate Type Axial Piston Pumps for Open Circuits in General Industrial Machinery," Kawasaki K3VG, Kawasaki Motor Corp., USA, 2006, 24 pages.

* cited by examiner

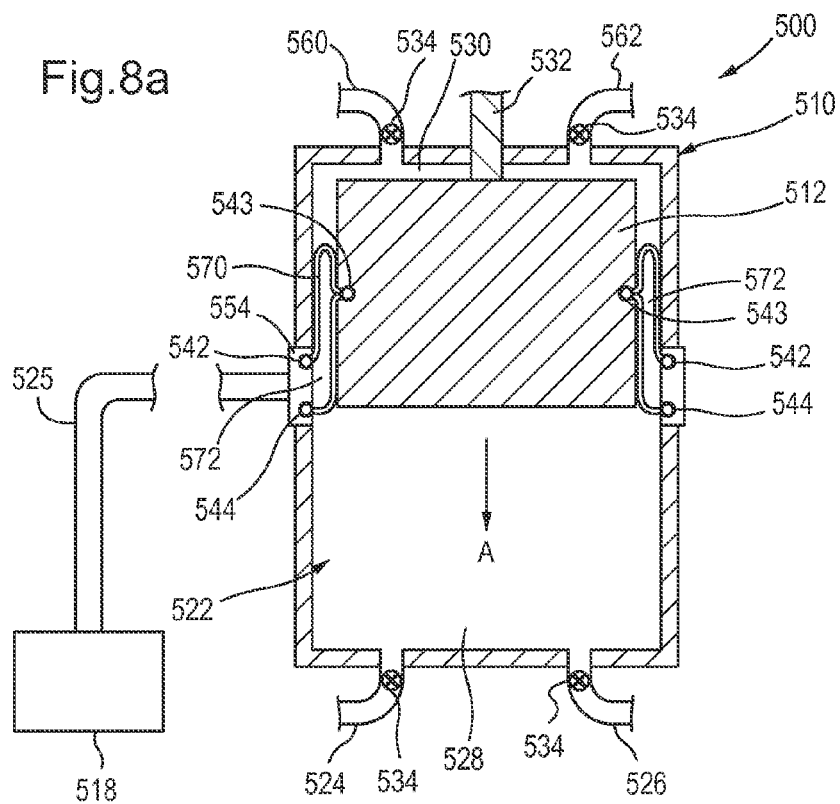
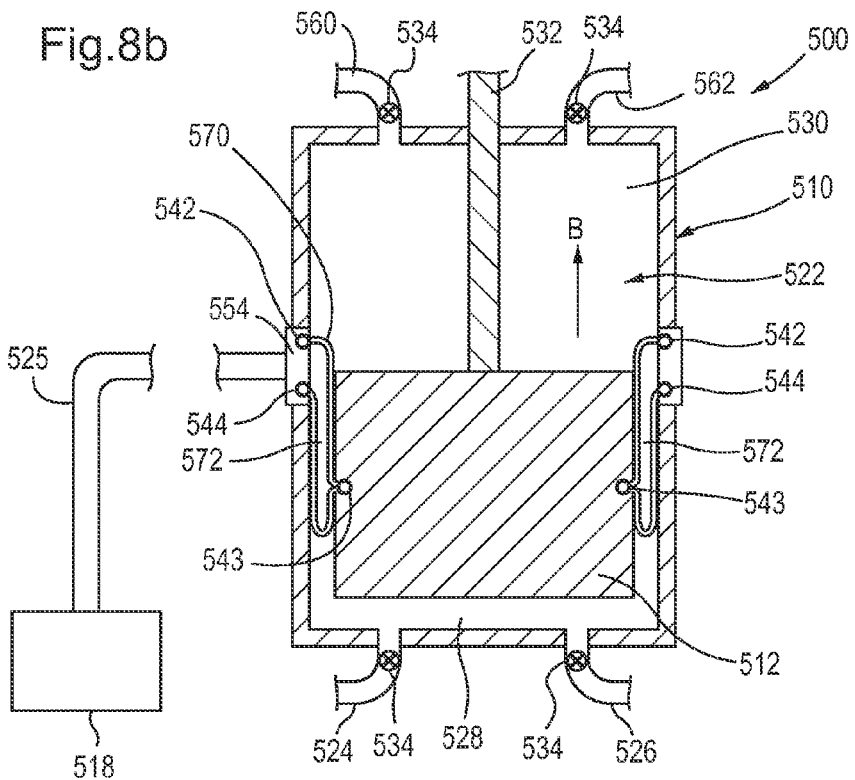

COMPRESSOR AND/OR EXPANDER DEVICE WITH ROLLING PISTON SEAL

CROSS REFERENCE TO RELATED APPLICATIONS

This application claims priority to and the benefit of U.S. Provisional Application Ser. No. 61/420,505, entitled "Compressor and/or Expander Device with Rolling Piston Seal," filed Dec. 7, 2010, the disclosure of which is hereby incorporated by reference herein in its entirety.

BACKGROUND

The invention relates generally to devices, systems and methods for the compression and/or expansion of a gas, such as air, and/or the pressurization of a liquid, such as water, and particularly to such a device that includes a rolling piston seal.

Known devices and systems can include a cylindrical housing with a movable piston disposed therein. Some known devices include the use of a gas, such as air, to move the piston to produce an output of work. Some pneumatic devices are used to compress and/or expand a gas, such as air. For example, a piston can be moved within a cylinder to push or move the gas out of the cylinder at an increased pressure. Such a device can be used, for example, in a compressed air energy storage system. Other devices can be used to pressurize a liquid, such as water, and/or pump the pressurized liquid, by applying force/work to a piston disposed within a cylinder in contact with the liquid. Such devices, or other devices, can also produce an output of work by urging pressurized liquid into the cylinder and against the piston.

In some known devices, a seal is disposed, for example, between an outer surface of the piston and an inner surface of the cylinder, to provide a fluid-tight seal between the piston and the cylinder wall. Various types of seals can be used, such as, for example, o-rings disposed on an outer surface of the piston and/or disposed on an inner surface of the cylinder, such that the piston can move relative to the cylinder while still maintaining a fluid-tight fit. However, use of traditional o-ring type seals can still require precision machining on the inner surface of the cylinder to produce a good seal and minimize wear on the o-ring, and can generate frictional losses caused by the sliding contact between the o-ring and the surface against which it seals (e.g. the cylinder wall), resulting in energy loss through heat. Some known devices that use fluid to move the piston to produce an output can include what is referred to as a rolling seal or a rolling diaphragm disposed between the piston and the cylinder wall.

In a compressed air energy storage system, the pressure vessel(s) or cylinder(s) in such systems can be very large in diameter, particularly at the early stages of a compression process. A rolling seal may be useful in such systems to compress and/or expand gas. For example, forming a precision machined surface on the interior of a large pressure vessel sufficient to receive a movable piston with a fluid-tight seal can be difficult and costly. For example, a pressure vessel may need to undergo a honing and chroming process to create a suitable surface to enable a smooth yet fluid-tight sliding movement of the piston within the pressure vessel. Thus, there is a need to provide improved sealing mechanisms in devices, such as pneumatic devices used to compress and/or expand air. There is also a need to improve the performance of known rolling seals.

SUMMARY OF THE INVENTION

In some embodiments, an apparatus includes a pressure vessel that defines an interior region in which at least one of a liquid and a gas can be contained. A piston is movably disposed within the interior region of the pressure vessel. The piston divides the interior region into a first interior region on a first side of the piston and a second interior region on a second, opposite side of the piston. The piston is movable between a first position in which fluid having a first pressure is disposed within the first interior region and the first interior region has a volume greater than a volume of the second interior region, and a second position in which fluid having a second pressure is disposed within the second interior region and the second interior region has a volume greater than a volume of the first interior region. A seal member is attached to the piston and is attached to the pressure vessel. The seal member configured to move between a first configuration in which at least a portion of the seal member is disposed at a first position within the pressure vessel when the piston is in its first position, and a second configuration in which the at least a portion of the seal member is disposed at a second position within the pressure vessel when the piston is in its second position.

BRIEF DESCRIPTION OF THE DRAWINGS

FIG. 5 is a side view shown partially in cross-section of a portion of the compressor device of FIG. 2a.

FIG. 8a is a partial cross-sectional view of a portion of a compressor device according to another embodiment shown in a first configuration.

FIG. 8b is a partial cross-sectional view of the portion of the compressor device of FIG. 8a shown in a second configuration.

DETAILED DESCRIPTION

Figure 1:
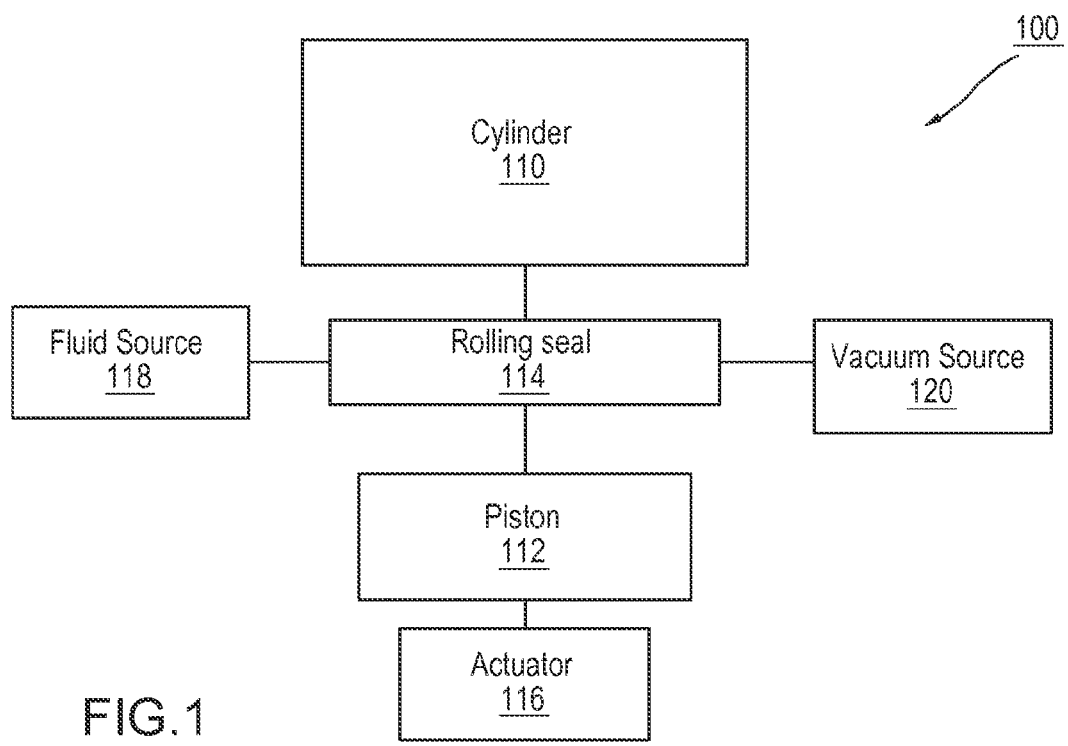
FIG. 1 is a schematic illustration of a compressor device according to an embodiment.

Devices and systems used to compress and/or expand a gas, such as air, and/or to pressurize and/or pump a liquid, such as water, are described herein. Pneumatic devices described herein can be used to compress gas within a cylinder or pressure vessel. As described herein, a piston can be movably disposed within a cylinder or pressure vessel and actuated to compress air within the cylinder or pressure vessel. Such a device can include a single-acting piston configured to compress gas when moved in a single direction, or a double-acting piston configured to compress gas when moved in either direction. Pneumatic devices as described herein can include what is referred as "a rolling seal" (also referred to herein as "rolling piston seal" or "rolling diaphragm") disposed between the cylinder or pressure vessel and the piston. The rolling seal can provide a fluid-tight seal between the piston and the cylinder wall during movement of the piston relative to the cylinder and reduce or eliminate the need to precision machine (e.g., hone and chrome) the inner surface of the pressure vessel. In some embodiments, pneumatic devices as described herein can be used in a compressed air energy storage (CAES) system.

In some CAES systems, devices can be actuated with, for example, hydraulic and/or pneumatic actuators. For example, in some compressed air devices and systems, a mechanical piston can be used to move or compress gas, such as air. In some compressed air devices and systems, a hydraulic actuator can be used to move or compress air within a pressure vessel. For example, an actuator can move a liquid within a pressure vessel such that the liquid compresses air in the pressure vessel. Such compressed air devices and systems are described in U.S. Patent Publication No. 2011/0061836; U.S. Patent Publication No. 2011/0062166; and U.S. Patent Publication No. 2011/0061741, each titled "Compressor and/or Expander Device" (collectively referred to as "the Compressor and/or Expander Device applications"), incorporated herein by reference in their entirety. The Compressor and/or Expander Device applications describe a CAES that can include multiple stages of compression and/or expansion. As described herein, compressor/expander devices using pneumatic actuators and rolling seals can also be used within a CAES.

In some embodiments, an apparatus includes a pressure vessel that defines an interior region in which at least one of a liquid and a gas can be contained. A piston is movably disposed within the interior region of the pressure vessel. The piston divides the interior region into a first interior region on a first side of the piston and a second interior region on a second opposite side of the piston. The piston is movable between a first position in which gas having a first pressure is disposed within the first interior region and the first interior region has a volume greater than a volume of the second interior region, and a second position in which gas having a second pressure is disposed within the second interior region and the second interior region has a volume greater than a volume of the first interior region. A seal member is attached to the piston and is attached to the pressure vessel. The seal member configured to move between a first configuration in which at least a portion of the seal member is disposed at a first position within the pressure vessel when the piston is in its first position, and a second configuration in which the at least a portion of the seal member is disposed at a second position within the pressure vessel when the piston is in its second position.

In some embodiments, an apparatus includes a pressure vessel that defines an interior region in which at least one of a liquid and a gas can be contained. A piston is movably disposed within the interior region of the pressure vessel between a first position and a second position within the interior region of the pressure vessel. A seal member is attached to the piston and attached to the pressure vessel. The seal member defines an interior region configured to contain a pressurized fluid. The seal member is configured to move between a first configuration in which at least a portion of the seal member is disposed at a first position within the pressure vessel when the piston is in its first position, and a second configuration in which the at least a portion of the seal member is disposed at a second position within the pressure vessel when the piston is in its second position.

In some embodiments, an apparatus includes a pressure vessel that defines an interior region in which at least one of a liquid and a gas can be contained. A piston is movably disposed within the interior region of the pressure vessel between a first position and a second position within the interior region of the pressure vessel. A seal member has a first end portion, a second end portion, and an intermediate portion. The first end portion and the second end portion are each coupled to the pressure vessel and the intermediate portion is coupled to the piston, the seal member is configured to move between a first configuration in which at least a portion of the seal member is disposed at a first position within the pressure vessel when the piston is in its first position, and a second configuration in which the at least a portion of the seal member is disposed at a second position within the pressure vessel when the piston is in its second position.

FIG. 1 is a schematic illustration of a compressor device according to an embodiment. A compressor device 100 includes a cylinder 110 (also referred to herein as "pressure vessel") and a piston 112 movably disposed within an interior region (not shown) defined by the cylinder 110. At least one rolling seal member 114 is disposed within the interior region of the cylinder 110 and is attached to the piston 112 and to the cylinder 110. The compressor device 100 can be used, for example, to compress a gas, such as air, within the cylinder 110.

The cylinder 110 can include an inlet conduit (not shown in FIG. 1) and an outlet conduit (not shown in FIG. 1) each in fluid communication with the interior region of the cylinder 110. The compressor device 100 can include multiple valves (not shown in FIG. 1) coupled to the inlet conduit and/or outlet conduit and/or to the cylinder 110. The valves can be configured to operatively open and close the fluid communication to and from the cylinder 110. Examples of use of such valves are described in more detail in the Compressor and/or Expander Device applications incorporated by reference above. The cylinder 110 can contain within the interior region a fluid, such as a liquid and/or a gas that can be communicated to and from the interior region via the inlet conduit and the outlet conduit, respectively. In some embodiments, the cylinder 110 is configured to contain gas, such as air.

The piston 112 is movably disposed within the interior region of the cylinder 110 and can divide the interior region between a first interior region and a second interior region. The piston 112 can also be coupled to an actuator 116 via a piston rod (not shown in FIG. 1). The actuator 116 can be for example, an electric motor or a hydraulically driven actuator such as, for example, the hydraulic actuators described in U.S. Provisional Patent App. No. 61/290,107, to Aborn et. al. ("the Aborn application"), entitled "System and Methods for Optimizing efficiency of a Hydraulically Actuated System," the disclosure of which is incorporated herein by reference in its entirety. The actuator 116 can be used to move the piston 112 back and forth within the interior region of the cylinder 110. As the piston 112 moves back and forth within the interior region of the cylinder 110, a volume of the first interior region and a volume of the second interior region will each change. For example, the piston 112 can be moved between a first position in which the first interior region includes a volume of fluid greater than a volume of fluid in the second interior region, and a second position in which the second interior region includes a volume of fluid greater than a volume of fluid in the first interior region. As used herein, "fluid" means a liquid, gas, vapor, suspension, aerosol, or any combination thereof.

In some embodiments, the piston 112 is moved within the cylinder 110 to compress a gas, such as air, within the cylinder 110. In some embodiments, the compressor device 100 can be configured to be single-acting in that the piston 112 can be actuated to move or compress air in only a single direction. In some embodiments, the compressor device 100 can be configured to be double-acting in that the piston 112 can be actuated in two directions. In other words, the piston 112 can be actuated to compress and/or expand gas (e.g., air) in two directions. For example, in some embodiments, as the piston 112 is moved in a first direction, a first volume of fluid having a first pressure can enter the first interior region of the cylinder 110 on one side of the piston 112, and a second volume of gas having a second pressure can be compressed by the other side of the piston 112 in the second interior region and then exit the second interior region. When the piston 112 is moved in a second direction opposite the first direction, the first volume of gas within the first interior region can be compressed by the piston 112 and then exit the first interior region having a third pressure greater than the first pressure, and simultaneously a third volume of gas can enter the second interior region.

The rolling seal member 114 (also referred to herein as "rolling piston seal" and "rolling diaphragm") can be releasably attached or fixedly attached to the piston 112 and can be releasably attached or fixedly attached to the cylinder 110. The rolling seal member 114 is configured to be disposed within the interior region of the cylinder 110 between the piston 112 and an interior wall of the cylinder 110. The rolling seal member 114 can reduce or eliminate contact between the piston 112 and the interior wall of the cylinder 110 as the piston 112 is actuated. In some embodiments, more than one rolling seal member 114 can be disposed between the piston 112 and the cylinder 110. The rolling seal member 114 can be attached to the piston 112 at one or more attachment locations and can be attached to the cylinder 110 at one or more attachment locations.

The rolling seal member 114 can move or roll with the movement of the piston 112 while maintaining a fluid-tight seal between the piston 112 and the cylinder 110. For example, in some embodiments, the rolling seal member 114 can be moved between a first configuration in which the rolling seal member 114 is disposed at a first location within the cylinder 110 when the piston 112 is disposed in a first position or location within the cylinder 110, and a second configuration in which the rolling seal member 114 is disposed at a second location within the cylinder 110 when the piston 112 is disposed in a second position or location within the cylinder 110.

In some embodiments, the rolling seal member 114 can define a seal interior region configured to receive a pressurized fluid. For example, a pressurized fluid, such as a gas or liquid, can be pumped or otherwise introduced into the interior region of the rolling seal member 114 such that the rolling seal member 114 maintains a desired shape and pressure. In some embodiments the pressure can be greater than the maximum operating pressure of the interior region of the cylinder 110, such that the rolling seal member 114 maintains a positive pressure inflation. The pressure in the rolling seal member 114 can be constant or can be varied as a function of the pressure of the interior region of the cylinder 110, such that a constant pressure differential is maintained. In some embodiments, the fluid can be, for example, air pressurized to a pressure (e.g., 1 bar) above the maximum pressure of the compressor device 100. A source or supply of pressurized fluid 118 can be coupled to a supply line in fluid communication with the interior region of the rolling seal member 114. A fitting or valve can be, for example, coupled between the rolling seal member 114 and the source of pressurized fluid 118. In some embodiments, the pressurized fluid is introduced into the interior region and the rolling seal member 114 is closed such that there is no flow of the pressurized fluid in or out of the rolling seal member 114 once it is closed. In some embodiments, a flow of pressurized fluid is provided within the interior region of the rolling seal member 114 during actuation of the compressor device 100. In some embodiments, the rolling seal member 114 can include a mechanism to allow a small amount of the pressurized fluid to escape or leak from the rolling seal member 114. In some embodiments, the compressor device 100 can include two rolling seal members that collectively define an interior region to receive a pressurized fluid.

In some embodiments, a compressor device 100 can include two rolling seal members 114 that can define an interior region or space between them and the piston 112. The interior region in such an embodiment can contain a fluid (e.g., a gas or liquid) with a pressure lower than the inlet pressure of the compressor device 100. For example, if the pressure of a gas, such as air, entering cylinder 110 is at or just below atmospheric, the interior region or space between the rolling seal members 114 can be maintained at a pressure below atmospheric during actuation of the compressor device 100. A vacuum source 120 can be coupled to a supply line that is in fluid communication with the space defined between the rolling seal members 114 and the piston 112. The vacuum source 120 can be used to create a negative pressure within the space (e.g., to extract the gas (e.g., air) from the space). The maintenance of the desired pressure within the defined space can help prevent inversion or partial inversion of the rolling seal member 114 and can prevent and/or reduce wear on the rolling seal member 114. A manifold (not shown) can be included and coupled between the supply line to the vacuum source 120 and the cylinder 110 to ensure extraction of the gas (e.g., air) from the space during actuation of the compressor device 100. For example, the manifold can be in fluid communication with a slot or holes defined in the wall of the cylinder 110, which are in fluid communication with the space defined between the rolling seal members 114 and the piston 112.

In some embodiments, the rolling seal member 114 can be formed as a flexible sheet or membrane of material that can roll and/or collapse upon itself in a direction parallel to the direction of movement of the piston 112. The rolling seal member 114 can be, for example, a cylindrical sheet of material that wraps around the outer diameter of the piston 112 between the piston 112 and the cylinder 110. In some embodiments, the rolling seal member 114 can include edge portions configured to be attached to the piston 110 and the cylinder 110. In some embodiments, the rolling seal member is formed as an enclosed toroidal bag.

In some embodiments, the rolling seal member 114 is formed with a rubber material. The rubber can be, for example, resistant to fluids and contaminants that may enter the compressor device 100, and have wear characteristics suitable for use in a compressor environment. In some embodiments, the rolling seal member 114 can be formed with, for example, a natural rubber/polybutadiene rubber (NR/BR) blend. In some embodiments, the rolling seal member 114 can be formed with a fabric material that is coated with, for example, a polymer. In some embodiments, the rolling seal member 114 may include a thicker coating of material (e.g., rubber or polymer) on an outer surface, for example, that is in contact with the piston 112 during operation.

In some embodiments, the rolling seal member 114 is formed with a rubber material with one or more reinforcement members embedded within the material. In some embodiments, the rolling seal member 114 includes one or more reinforcement members that extend in a first direction and/or one or more reinforcement members that extend in a second direction. For example, in some embodiments, a rolling seal member 114 can include one or more reinforcement members that extend in an axial direction and one or more reinforcement members that extend in circumferential direction. In some embodiments, a rolling seal member 114 can include one or more reinforcement members that extend in first direction and one or more reinforcement members that extend in second direction that is transverse to the first direction. In some embodiments, the rolling seal member 114 can include reinforcement members that extend in only a single direction. For example, reinforcement members can extend circumferentially or axially.

The elasticity of the reinforcement members can be sufficient to prevent or reduce cyclic stretch of the rolling seal member 114 in an axial direction during actuation of the compressor device 100. Cyclic stretch of the rolling seal member 114 may be undesirable because it can cause possible wear against the piston 112 or cylinder 110. The elasticity of the reinforcement members in a circumferential direction can also be sufficiently high to allow for expansion between the piston 112 and the wall of the cylinder 110 as the piston 112 moves back and forth within the cylinder 110. In some embodiments, a rolling seal member 114 can include reinforcement member(s) formed with a laminate of two different grades of tyre cord disposed at 90 degrees, or an asymmetrically woven fabric. In some embodiments, one or more reinforcement members can be formed with a Nylon cord material, such as for example, Nylon 66, a polyaramid material such as Kevlar, or other suitable materials.

The rolling seal members 114 can be attached to the piston 112 with, for example, a clamped attachment bead portion (not shown in FIG. 1). For example, the attachment bead portion can include a metal or plastic rod or metal spring that is embedded within the material of the rolling seal member 114. In some embodiments, the attachment bead portion can include a rod or spring disposed within a folded-over edge portion of the rolling seal member 114. In some embodiments, the attachment bead portion can include a rod or spring disposed within a folded-over portion of the rolling seal member 114 at a location different than at an edge. For example, an attachment bead portion can be formed at an intermediate location between the two edges of the rolling seal member 114. In some embodiments, an attachment bead portion can be formed, for example, at approximately a mid-point between two edges of the rolling seal member 114. The rod or spring can be flexible such that it can curve or bend and be disposed in a circumferential configuration (e.g., wrapped around the piston). To attach the rolling seal member 114 to the piston, an attachment bead portion can be held within an annular groove defined in the piston with, for example, bolts, such that tension in the rolling seal member 114 is maintained along the peripheral extent of the bead portion. The rolling seal member 114 can be attached to the cylinder in a similar manner. Further details regarding the attachment of the rolling seal member 114 to the piston 112 and to the cylinder 110 are described below.

As discussed above, the rolling seal member 114 is disposed between the piston 112 and the cylinder 110 and can move with the movement of the piston 112. The inclusion of the rolling seal member 114 in the compressor device 100 allows for greater tolerance in the surface finish of the piston 112 and the cylinder 110. For example, the surface of the piston 112 and the surface of the cylinder 110 that are in contact with the rolling seal member 114 can vary such that the piston 112 and the cylinder 110 can be formed, for example, without precision machining. Thus, honing and chroming processes that are typically required to achieve a suitable surface for sealing by an o-ring between a piston and a cylinder in such pump devices may not be necessary. Such reduction in processing can result in a reduction in costs to manufacture the compressor device 100. For example, in some compressor devices, the cylinder or pressure vessel may have a diameter of 2 meters. Precision machining such a large cylinder can be very expensive and time consuming. In some embodiments, the piston 112 and the cylinder 110 can be formed, for example, with a sheet steel without the need for machining. In some embodiments, the piston 112 and/or the cylinder 110 can be formed with materials that may not otherwise be suitable for such applications because they are not susceptible to machining, such as a fiberglass material, or a plastic or polymer. In some embodiments, a surface protection layer, such as an epoxy, can also be applied to the surface of the piston 112 and/or cylinder 110.

Figure 2A:
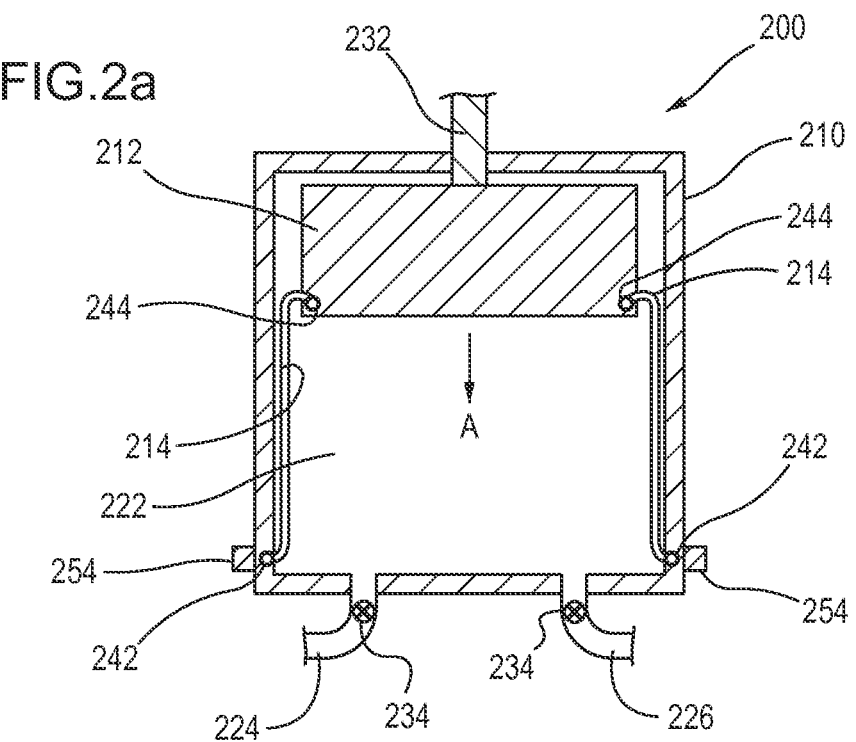
FIG. 2a is a partial cross-sectional view of a portion of a compressor device according to an embodiment shown in a first configuration.
Figure 2B:
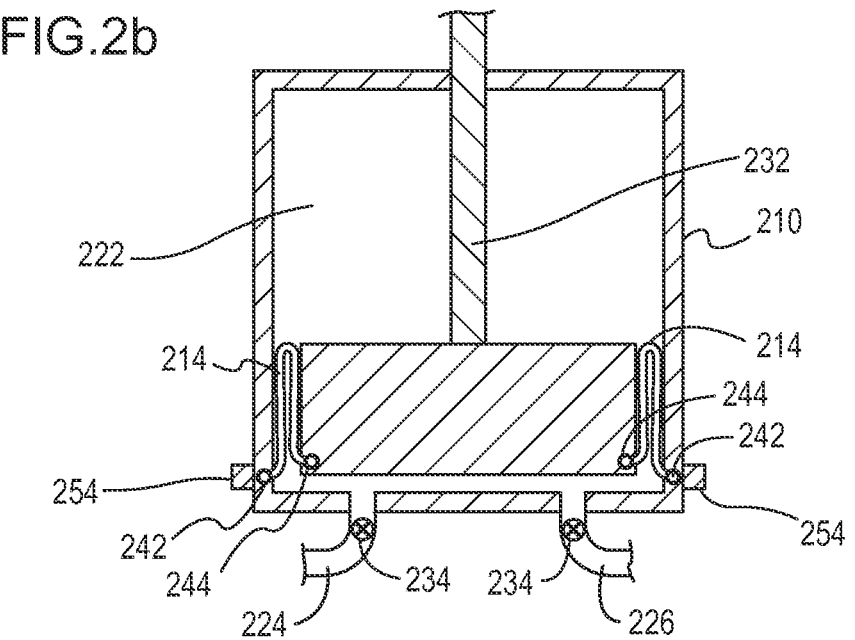
FIG. 2b is a partial cross-sectional view of the portion of the compressor device of FIG. 2a shown in a second configuration.

FIGS. 2a and 2b illustrate another embodiment of a compressor device. A compressor device 200 includes a cylinder or pressure vessel 210, a piston 212 movably disposed within an interior region 222 of the cylinder 210, and a rolling seal member 214. The rolling seal member 214 is movably disposed within the interior region 222 between the piston 214 and an interior wall of the cylinder 210. The compressor device 200 can be configured to compress a gas, such as air, within the cylinder 210.

The cylinder 210 can include an inlet conduit 224 (also referred to as "inlet") and an outlet conduit 226 (also referred to as "outlet") each in fluid communication with the interior region 222 of the cylinder 210. The cylinder 210 can contain within the interior region 222 a fluid, such as a liquid and/or a gas that can be communicated to and from the interior region via the inlet conduit 224 and the outlet conduit 226, respectively. The inlet conduit 224 can be coupled to for example, a source of gas, such as air. The outlet conduit 226 is configured to communicate a volume of compressed gas (e.g., air) from the interior region 222 to another location. For example, the outlet conduit 226 can be coupled to another compressor/expander device or another device configured to perform some action or work, or to a storage container configured to store compressed air. Valves 234 can be coupled to the inlet conduit 224 and the outlet 226. The valves 234 can be operated to open and close the fluid communication to and from the cylinder 210. As discussed above, examples of operation of such valves are also described in the Compressor and/or Expander Device applications incorporated by reference above.

The piston 212 is movably disposed within the interior region 222 of the cylinder 210 and can also be coupled to an actuator (not shown) via a piston rod 232. The actuator can be for example, an electric motor configured to move the piston 212 back and forth within the interior region 222 of the cylinder 210. In some embodiments, the piston 212 can be moved within the cylinder 210 to compress a gas, such as air, within the interior region 222 of the cylinder 210 as described above. In this embodiment, the compressor device 200 is single-acting in that the piston 212 can be actuated to move or compress air only when moving in one direction, as shown by arrow A in FIG. 2a.

Figure 3:
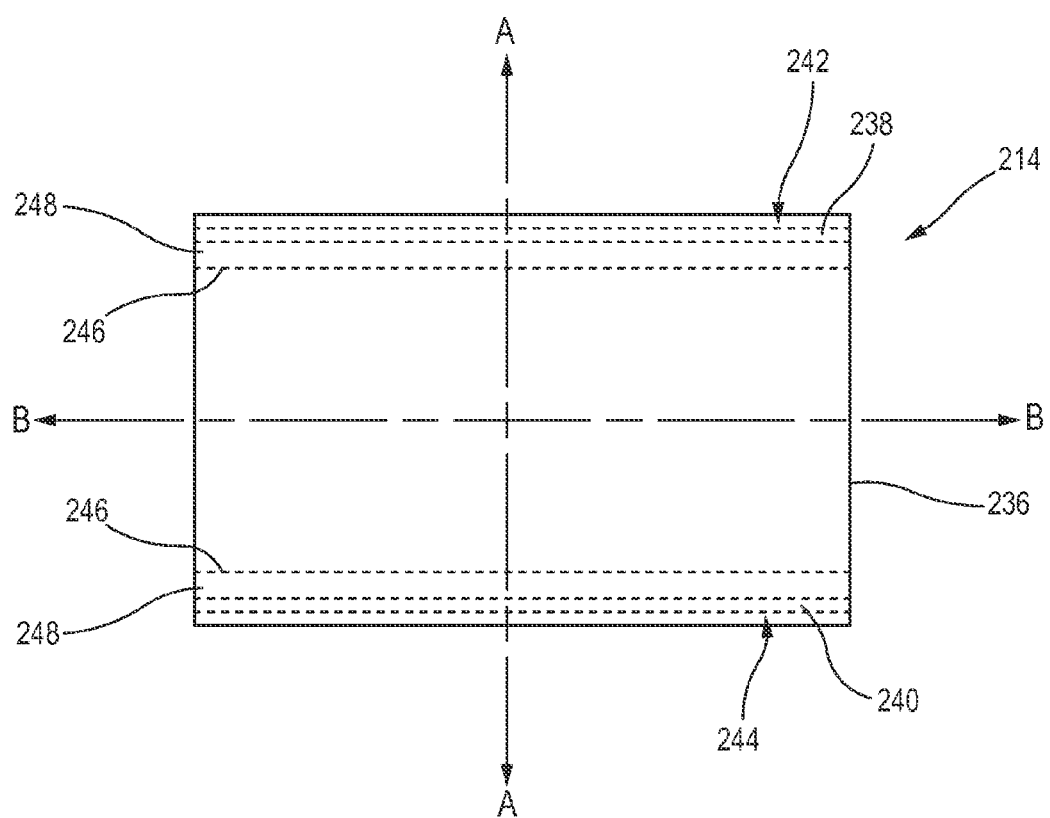
FIG. 3 is a side-view of a rolling seal according to an embodiment, shown in an unrolled configuration.
Figure 4:
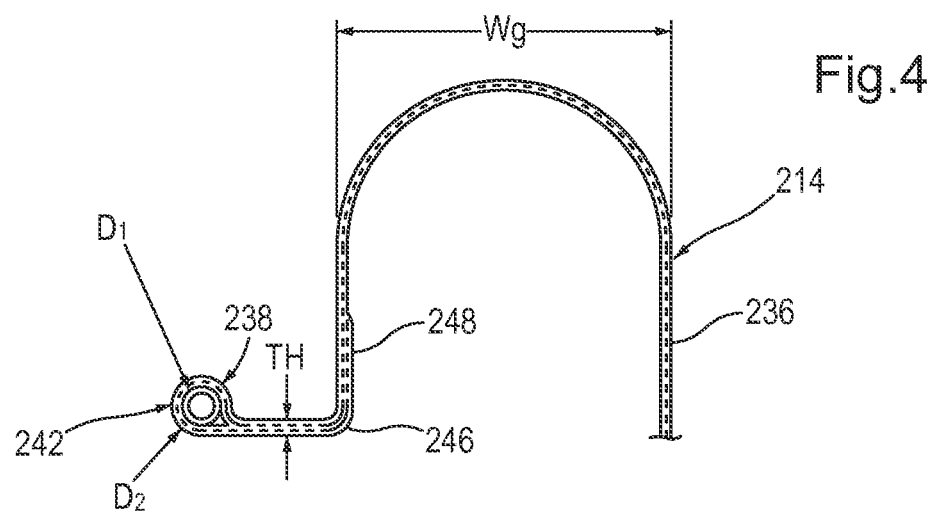
FIG. 4 is a side view of a portion of the rolling seal of FIG. 3.
Figure 5:
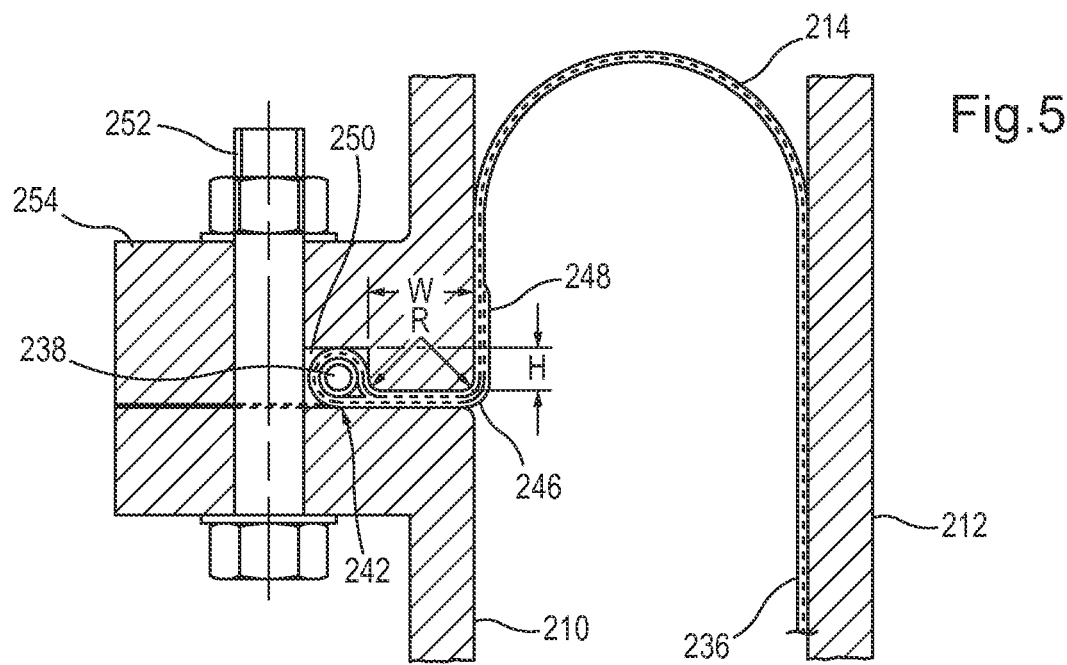

The rolling seal member 214 (also referred to herein as "rolling piston seal" and "rolling diaphragm") includes a circumferential sheet portion 236 and two attachment rods 238 and 240, as shown in FIG. 3. The sheet portion 236 is configured to be disposed circumferentially around the piston 212. The attachment rods 238 and 240 are each disposed within a double layer or folded-over edge portion 248 of the sheet portion 236 to form attachment beads 242 and 244, respectively, as shown in FIG. 3. In some embodiments, the rods 238, 240 can alternatively be embedded in the material of the sheet portion 236. As shown in FIGS. 4 and 5, a 90 degree bend 246 is formed in the edge portion 248 to allow for attachment of the attachment beads 242 and 244 to the cylinder 210 and piston 212, respectively, as described below. The rods 238, 240 can have a diameter D1, for example, of about 9 mm, and when disposed within the double layer edge portions 248, the attachment beads 242 and 244 can each have a diameter D2 of, for example, about 13 mm. In some embodiments, the double layer edge portion 248 can have a thickness Th of for example, about 3.8 mm. In some embodiments, the sheet portion 236 can have a thickness of, for example, 2.5 mm.

The sheet portion 236 can be formed, for example, with a rubber material, or other suitable flexible material, as described previously. The attachment rods 238, 240 can also be formed as described previously. The rolling seal member 214 can also include reinforcement members (not shown) embedded within the material of the sheet portion 236. For example, one or more axial reinforcement members can extend in a direction of the axis A-A in FIG. 3, and/or one or more circumferential reinforcement members can extend in a direction of axis B-B in FIG. 3. In some embodiments, the reinforcement members can extend in additional or alternative directions that are eccentric to axis A-A and axis B-B in FIG. 3.

The attachment bead 242 is used to attach the rolling seal member 214 to the wall of the cylinder 210 and the attachment bead 244 is used to attach the rolling seal member 214 to the piston 212. As shown in FIG. 5, the attachment bead 242 is received within an annular groove 250 defined in an annulus portion 254 in the wall of the cylinder 210, and the attachment bead 244 can be received in an annular groove (not shown) in the piston 212 in a similar manner. The radius R of the cylinder wall at the bend portion 246 and at or near the entrance to the groove 250 can be, for example, about 3 mm, and a width W defined between the bend portion 246 and the groove 250 can be, for example, about 25 mm. The groove 250 can have a height H, for example, of about 10 mm. A bolt 252 is coupled to the annulus portion 254 of the cylinder 210 and used as a clamp to hold the attachment bead 242 within groove 250. An interference fit on the clamping of the attachment bead 242 in the direction of a longitudinal axis of the bolts can be provided, and the rolling seal member 214 can act as an o-ring to seal the clamping area. Although not shown, the attachment bead 244 can be attached to the piston 212 in a similar manner. As shown in FIG. 4, a width Wg of the rolling seal member 214 configured to be disposed within the gap between the piston 212 and the wall of the cylinder 210 can be, for example, between about 25 mm and about 50 mm.

The rolling seal member 214 can move or roll with the movement of the piston 212 while maintaining a fluid-tight seal between the piston 212 and the cylinder 210. The rolling seal member 214 can be moved between a first configuration in which the rolling seal member 214 is disposed at a first location within the cylinder 210 when the piston 212 is disposed in a first position or location within the cylinder 210 as shown in FIG. 2a, and a second configuration in which the rolling seal member 214 is disposed at a second location within the cylinder 210 when the piston 212 is disposed in a second position or location within the cylinder 210 as shown in FIG. 2b.

In use, to compress a gas, such as air within the compressor device 200, air having a first pressure can be introduced through the inlet conduit 224 and into the interior region 222. The piston 212 can be actuated to move the piston 212 from a first position as shown in FIG. 2a to a second position as shown in FIG. 2b. As the piston 212 moves in the direction of arrow A, the piston 212 compresses the air within the interior region 222 as it forces or displaces the compressed air out of the cylinder 210 and into the outlet conduit 226. Thus, the compressed air exiting the interior region 222 has a greater pressure than the air that enters the interior region 222.

Figure 6A:
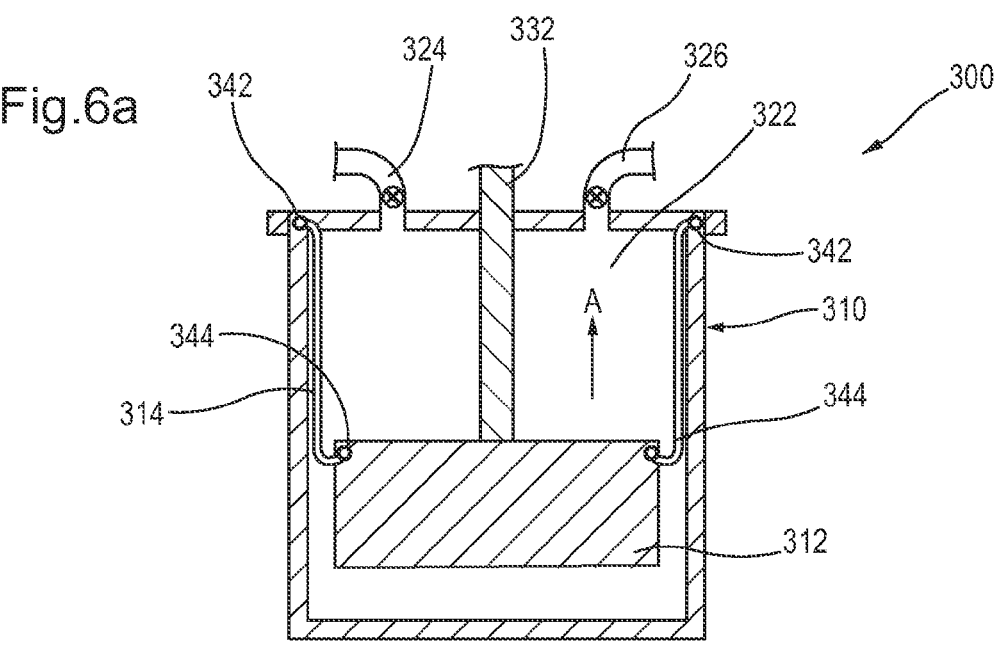
FIG. 6a is a partial cross-sectional view of a portion of a compressor device according to another embodiment shown in a first configuration.
Figure 6B:
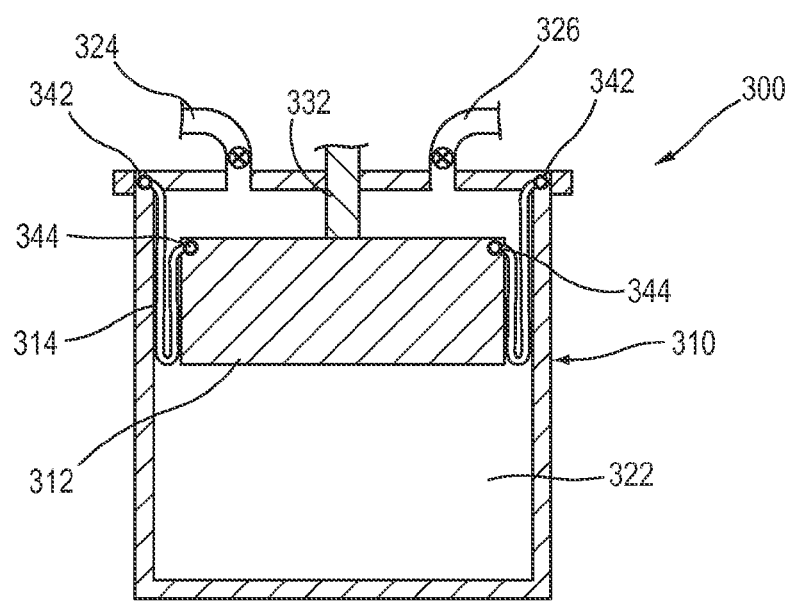
FIG. 6b is a partial cross-sectional view of the portion of the compressor device of FIG. 6a shown in a second configuration.

FIGS. 6a and 6b illustrate a compressor device 300 having a similar configuration as the compressor device 200. Thus, some features of the compressor device 300 that are the same as compressor device 200 will not be described in detail with reference to FIGS. 6a and 6b. In this embodiment, the compressor device 300 includes a cylinder or pressure vessel 310, a piston 312 movably disposed within an interior region 322 of the cylinder 310, and a rolling seal member 314. The compressor device 300 is single-acting and can be configured to compress a gas, such as air, within the cylinder 310 as described above for previous embodiments. An inlet conduit 324 and an outlet conduit 326 are coupled to and in fluid communication with the cylinder 310 at a top end of the cylinder 310. The piston 312 includes a piston rod 332 that can be coupled to an actuator (not shown) to move the piston 312 back and forth within the cylinder 310.

The rolling seal member 314 can be formed the same as or similar to the rolling seal member 214, and includes attachment beads 342 and 344 configured to attach the rolling seal member 314 to the cylinder 310 and piston 312, respectively, as described for rolling seal member 214. The rolling seal member 314 can move or roll with the movement of the piston 312 between a first configuration as shown in FIG. 6a, and a second configuration, as shown in FIG. 6b. For example, as the piston 312 is moved in the direction of arrow A, the rolling seal member 314 will move from a first position as shown in FIG. 6a to a second position as shown in FIG. 6b. In this embodiment, the attachment bead 342 is coupled to a top portion of the cylinder 310 and the attachment bead 344 is coupled to a bottom portion of the piston 312. With this configuration, the rolling seal member 314 can hang in a downward direction as the rolling seal member 314 moves between its first configuration (FIG. 6a) and second configuration (FIG. 6b) with the movement of the piston 312.

Figure 7A:
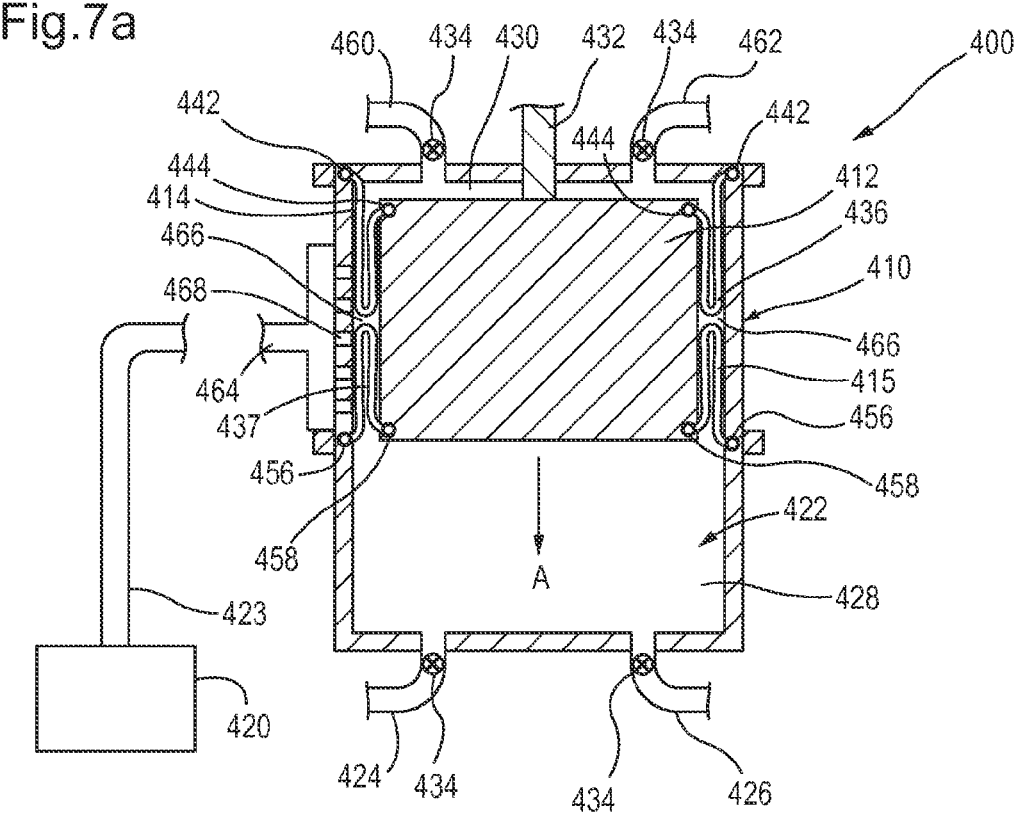
FIG. 7a is a partial cross-sectional view of a portion of a compressor device according to another embodiment shown in a first configuration.
Figure 7B:
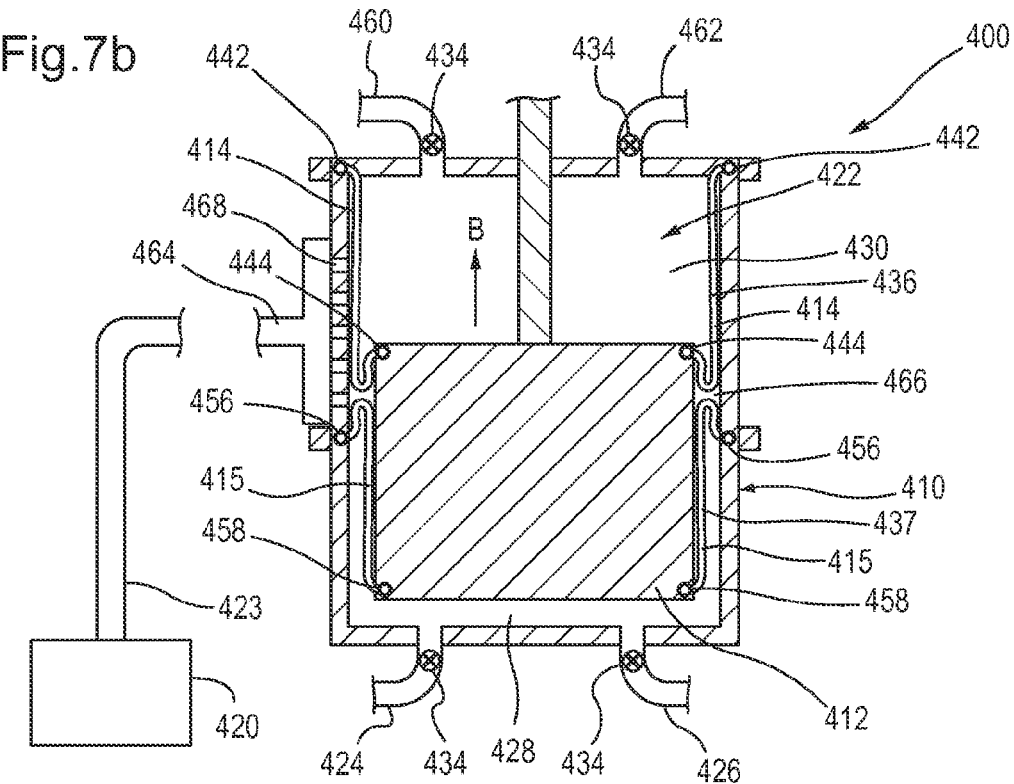
FIG. 7b is a partial cross-sectional view of the portion of the compressor device of FIG. 7a shown in a second configuration.

FIGS. 7a and 7b illustrate another embodiment of a compressor device. A compressor device 400 includes a cylinder or pressure vessel 410, a piston 412 movably disposed within an interior region 422 of the cylinder 410, a first rolling seal member 414 and a second rolling seal member 415. The rolling seal member 414 and the rolling seal member 415 are each movably disposed within the interior region 422 between the piston 412 and an interior wall of the cylinder 410. The compressor device 400 can be configured to compress a gas, such as air, within the cylinder 410 as described above for previous embodiments.

The piston 412 divides the interior region 422 between a first interior region 428 (e.g., see FIG. 7a) and a second interior region 430 (e.g., see FIG. 7b), and can be coupled to an actuator (not shown) via a piston rod 432 as described for previous embodiments. The actuator can be used to move the piston 412 back and forth within the interior region 422 of the cylinder 410. As the piston 412 moves back and forth within the interior region 422 of the cylinder 410, a volume of the first interior region 428 and a volume of the second interior region 430 will each change. For example, the piston 412 can be moved between a first position in which the first interior region 428 has a greater volume than a volume of the second interior region 430, as shown in FIG. 7a, and a second position in which the second interior region 430 has a greater volume than a volume of the first interior region 428 as shown in FIG. 7b.

The cylinder 410 includes an inlet conduit 424 (also referred to as "inlet") and an outlet conduit 426 (also referred to as "outlet") each in fluid communication with the first interior region 428, and an inlet conduit 460 (also referred to as "inlet") and an outlet conduit 462 (also referred to as "outlet") each in fluid communication with the second interior region 430. The inlets 424 and 460 can each be coupled to a source of gas and can communicate the gas to the interior region 422. The outlets 426 and 462 can each be configured to communicate a volume of compressed gas (e.g., air) from the interior region 422 to another location. For example, the outlet 426 and/or the outlet 462 can each be coupled to another compressor/expander device or another device configured to perform some action or work, or to a storage container configured to store compressed air. Valves 434 can be coupled to the inlets 424 and 460 and the outlets 426 and 462 and can be operated to open and close the fluid communication to and from the cylinder 410 as described above for previous embodiments.

The rolling seal member 414 and the rolling seal member 415 can each be configured the same as or similar to the rolling seal member 214 described above. Thus, the rolling seal member 414 includes a circumferential sheet portion 436 and two attachment rods (not shown) that form an attachment bead 442 and an attachment bead 444, and the rolling seal member 415 includes a circumferential sheet portion 437 and two attachment rods (not shown) that form an attachment bead 456 and an attachment bead 458, as described for rolling seal member 214. The attachment beads 442 and 456 are each used to attach the rolling seal member 414 and rolling seal member 415, respectively, to the wall of the cylinder 410, and the attachment beads 444 and 458 are each used to attach the rolling seal member 414 and rolling seal member 415, respectively, to the piston 412 as described above with reference to FIGS. 4 and 5. For example, the cylinder 410 can include two annular grooves (similar to groove 250 described above) configured to receive the attachment bead 442 of the rolling seal member 414 and the attachment bead 456 of rolling seal member 415. The piston 412 can also include two annular grooves configured to receive the attachment bead 444 of the rolling seal member 414 and the attachment bead 458 of the rolling seal member 415.

In this embodiment, the two rolling seal members 414 and 415 define an interior region or space 466 between them and the piston 412. The interior region 466 can contain a fluid (e.g., a gas or liquid) with a pressure lower than the inlet pressure of the compressor device 400. For example, if the pressure of a gas, such as air, entering cylinder 410 is at or just below atmospheric, the interior region or space 466 between the rolling seal members 414 and 415 can be maintained at below atmospheric pressure during actuation of the compressor device 400. A vacuum source 420 can be coupled to a supply line 423 that is in fluid communication with the space 466 via a manifold 464. For example, the manifold 464 can include openings (not shown) in fluid communication with multiple apertures 468 defined in the wall of the cylinder 410, which are in fluid communication with the space 466. The vacuum source 420 can be used to create a negative pressure within the space 466 (e.g., to extract the gas (e.g., air) from the space). The maintenance of the desired pressure within the defined space can help prevent inversion or partial inversion of the rolling seal members 414 and 415, and can prevent and/or reduce wear on the rolling seal members 414 and 415. The manifold 464 can distribute the vacuum pressure and ensure extraction of the gas (e.g., air) from the space 466 during actuation of the compressor device 400.

In this embodiment, the rolling seal member 414 and the rolling seal member 415 can each move or roll with the movement of the piston 412 (e.g., movement back and forth or up and down within the cylinder 410) while maintaining a fluid-tight seal between the piston 412 and the cylinder 410. The rolling seal member 414 and the rolling seal member 415 can each be moved between a first configuration in which the rolling seal member 414 and the rolling seal member 415 are each disposed at a first location within the cylinder 410 when the piston 412 is disposed in a first position or location, as shown in FIG. 7a, and a second configuration in which the rolling seal member 414 and the rolling seal member 415 are each disposed at a second location within the cylinder 410 when the piston 412 is disposed in a second position or location within the cylinder 410 as shown in FIG. 7b.

In use, the piston 412 can be actuated or moved within the cylinder 410 to compress a gas, such as air, within the cylinder 410. In this embodiment, the compressor device 400 is double-acting in that the piston 412 can be actuated to move or compress air when moving in each of the two directions in which it moves. For example, with the valve 434 at the inlet 426 open and the valve at the outlet 426 closed, a gas (e.g., air) having a first pressure can be introduced into the first interior region 428 via the inlet 424. The valve 434 at the inlet 424 can then be closed and the valve 434 at the outlet 426 can be opened. The piston 412 can be actuated in the direction of arrow A as shown in FIG. 7a, to move or compress the gas as it is moved or displaced out of the first interior region 428 and into the outlet conduit 426. The air moving out of the first interior region 428 will have a second pressure greater than the first pressure of the air when it entered the first interior region 428. Simultaneously, as the piston 412 moves in the direction of arrow A, the valve 434 at inlet 460 can be open and the valve 434 at outlet 462 can be closed, such that air having a first pressure can be introduced or drawn into the second interior region 430 via inlet 460. The valve 434 at the inlet 460 can then be closed and the valve 434 at the outlet 462 can be opened. The piston 412 can then be actuated to move in the direction of arrow B as shown in FIG. 7*b* to move or displace the air in second interior region 430 as it is moved out of the second interior region 430 and into the outlet conduit 462. The air moving out of the second interior region 430 will have a second pressure greater than the first pressure of the air when it entered the second interior region 430. As the air is moved out of the second interior region 430, air can again be introduced into the first interior region 428 via the inlet 424. This cycle can continue as the piston 412 is moved back and forth within the cylinder 410.

FIGS. 8*a* and 8*b* illustrate another embodiment of a compressor device. A compressor device 500 includes a cylinder or pressure vessel 510, a piston 512 movably disposed within an interior region 522 of the cylinder 510, and a rolling seal member 570. The rolling seal member 570 is movably disposed within the interior region 522 between the piston 512 and an interior wall of the cylinder 510. The compressor device 500 can be configured to compress a gas, such as air, within the cylinder 510 as described above for previous embodiments.

The piston 512 divides the interior region 522 between a first interior region 528 (see e.g., FIG. 8*a*) and a second interior region 530 (see e.g., FIG. 8*b*) and can be coupled to an actuator (not shown) via a piston rod 532 as described above for previous embodiments. The actuator can be used to move the piston 512 back and forth (or up and down) within the interior region 522 of the cylinder 510. As the piston 512 moves back and forth within the interior region 522 of the cylinder 510, a volume of the first interior region 528 and a volume of the second interior region 530 will each change. For example, the piston 512 can be moved between a first position in which the first interior region 528 has a greater volume than a volume of the second interior region 530, as shown in FIG. 8*a*, and a second position in which the second interior region 530 has a greater volume than a volume of the first interior region 528 as shown in FIG. 8*b*.

The cylinder 510 includes an inlet conduit 524 (also referred as "inlet") and an outlet conduit 526 (also referred to as "outlet") each in fluid communication with the first interior region 528, and an inlet conduit 560 (also referred as "inlet") and an outlet conduit 562 (also referred to as "outlet") each in fluid communication with the second interior region 530. The inlet 524 and inlet 560 can each be coupled to a source of gas and can communicate the gas to the interior region 522. The outlets 526 and 562 can each be configured to communicate a volume of compressed gas (e.g., air) from the interior region 522 to another location as described above for previous embodiments. Valves 534 can be coupled to the inlets 524 and 560 and the outlets 526 and 562 and can be operated to open and close the fluid communication to and from the cylinder 510 as described above for previous embodiments.

Figure 9:
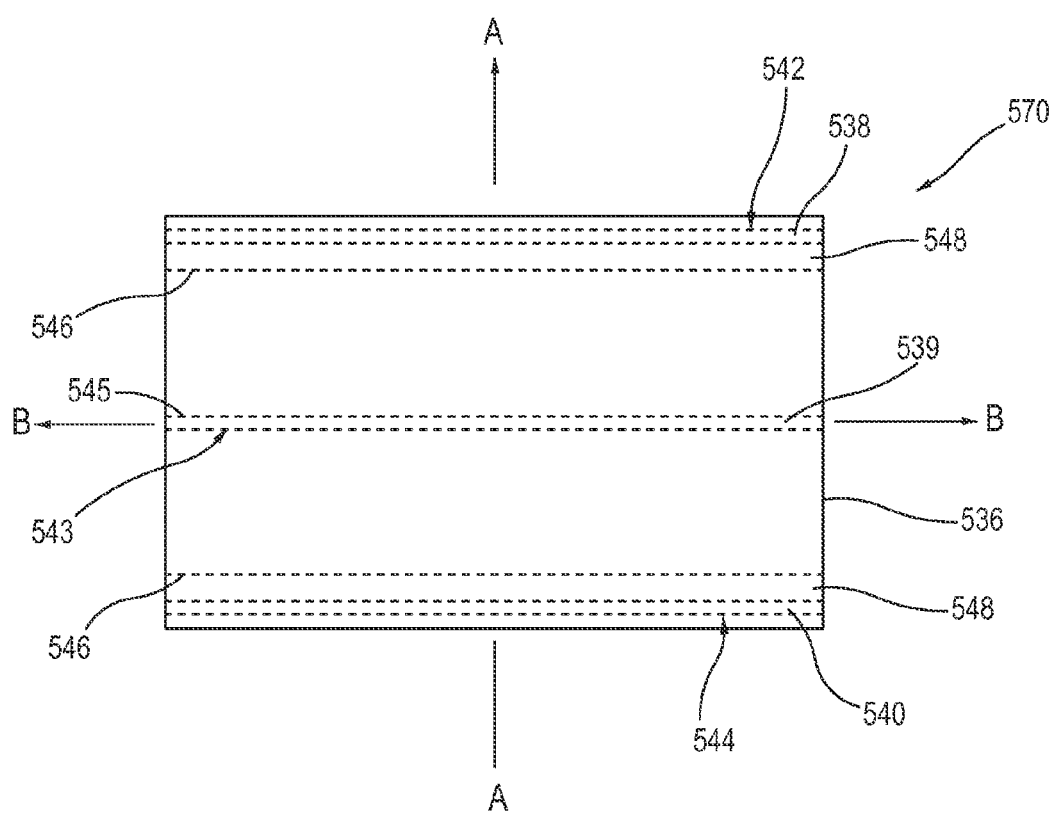
FIG. 9 is a side view of a rolling seal according to another embodiment, shown in an unrolled configuration.
Figure 10:
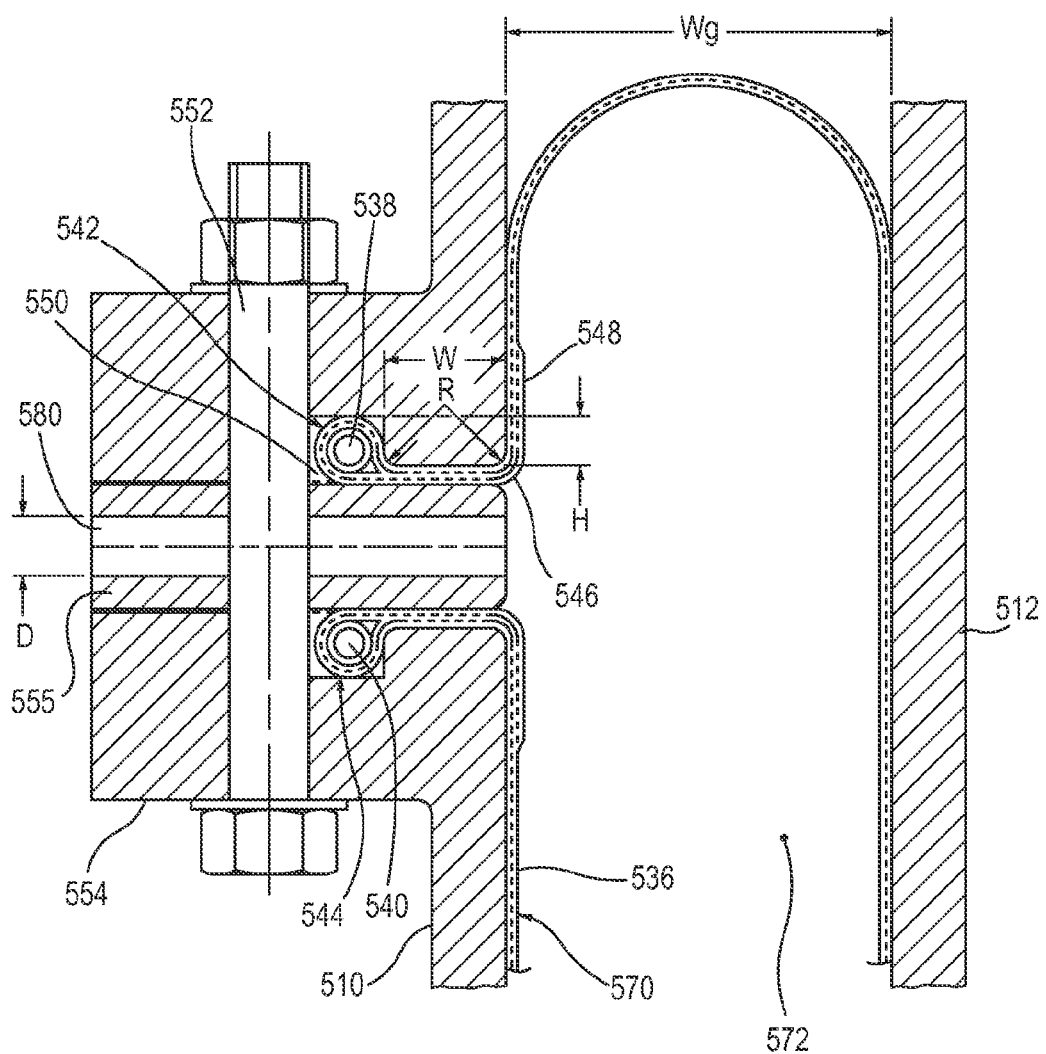
FIG. 10 is a partial cross-sectional view of a portion of the compressor device of FIGS. 8a and 8b.

In this embodiment, the rolling seal member 570 includes a circumferential sheet portion 536 and three attachment rods, 538, 540 and 539 as shown, for example, in FIG. 9. The attachment rods 538 and 540 are each disposed within a double layer or folded-over edge portion 548 of the sheet 536 to form attachment beads 542 and 544, respectively, as shown in FIGS. 9 and 10. As shown in FIG. 10, a 90 degree bend 546 is formed in the edge portion 548 near both the attachment bead 542 and the attachment bead 544. In some embodiments, the double layer edge portion 548 can have a thickness of for example, about 3.8 mm. In some embodiments, the sheet portion 536 can have a thickness of, for example, 2.5 mm.

Figure 11:
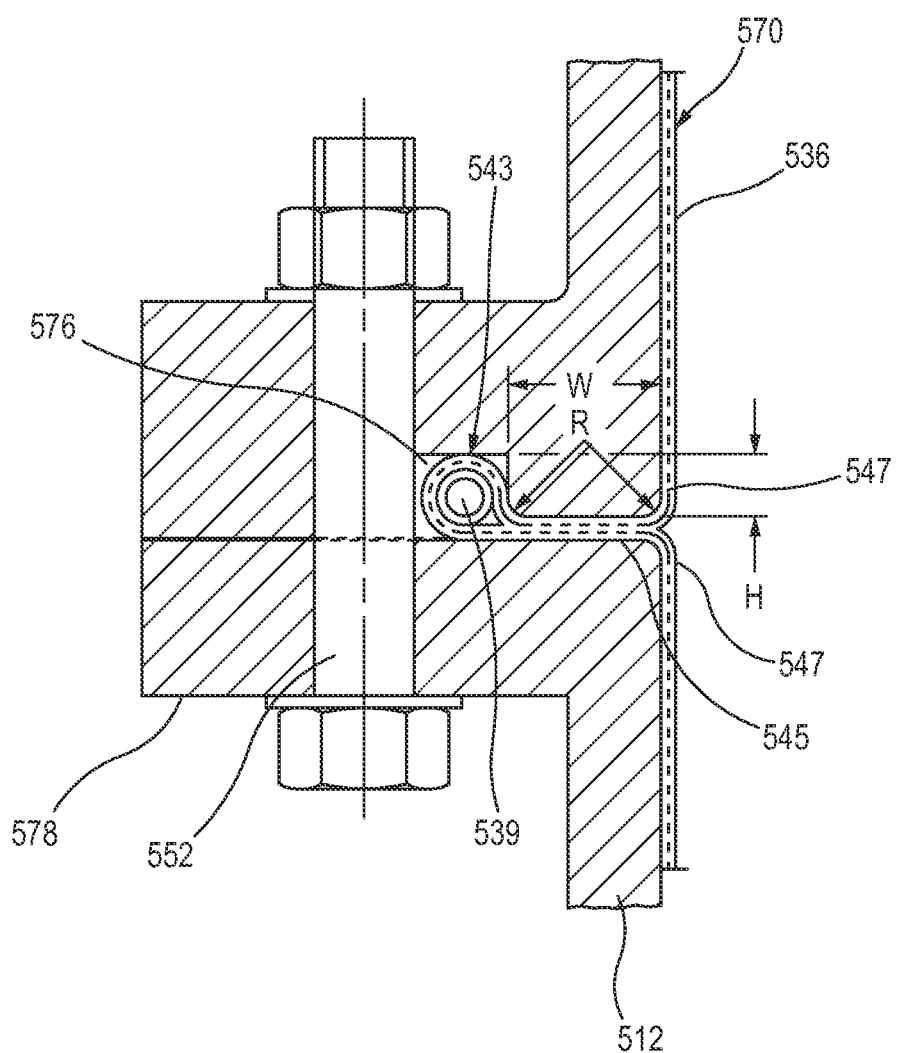
FIG. 11 is a partial cross-sectional view of a portion of the compressor device of FIGS. 8a and 8b.

The rod 539 is disposed within a pocket formed by a folded portion 545 of sheet 536 at an intermediate location on the sheet 536 to form attachment bead 543, as shown, for example, in FIG. 11. In some embodiments, the attachment bead 543 is located near or at a mid-point between rod 538 and rod 540. Two 90 degree bend portions 547 are formed near the folded portion 545 as shown in FIG. 11.

The sheet portion 536 can be formed, for example, with a rubber material, or other suitable flexible material, as described above for previous embodiments. The attachment rods 538, 540 and 539 can also be formed as described previously. The rolling seal member 570 can also include reinforcement members (not shown) embedded within the material of the sheet portion 536. For example, one or more axial reinforcement members can extend in a direction of the axis A-A in FIG. 9, and/or one or more circumferential reinforcement members can extend in a direction of axis B-B in FIG. 9.

The attachment beads 542 and 544 are each used to attach the rolling seal member 570 to the wall of the cylinder 510 (as shown, for example, in FIG. 10) and the attachment bead 543 is used to attach the rolling seal member 570 to the piston 512 (as shown, for example, in FIG. 11) in a similar manner as described above for previous embodiments. As shown in FIG. 10, the attachment bead 542 and the attachment bead 544 are each received within an annular groove 550 defined in an annulus portion 554 of the wall of the cylinder 510. A radius R of the cylinder wall at the bend portion 546 and at the entrance to the groove 550, can be for example, about 3 mm, and a width W defined between the bend portion 546 and the groove 550 can be, for example, about 25 mm. The groove 550 can have a height H, for example, of about 10 mm. A bolt 552 is coupled to the annulus portion 554 of the cylinder 510 to clamp and hold the attachment beads 542 and 544 within groove 550. An interference fit on the clamping of the attachment beads 542 and 544 in the direction of a longitudinal axis of the bolt 552 can be provided, and the rolling seal member 570 can act as an o-ring to seal the clamping area. As also shown in FIG. 10, a width Wg of the rolling seal member 570 configured to be disposed within the gap between the piston 512 and the wall of the cylinder 510 can be, for example, between about 25 and 50 mm.

The rolling seal member 570 can be attached to the piston 512 in a similar manner as shown in FIG. 11. The attachment bead 543 is received within an annular groove 576 defined in an interior annulus portion 578 of the piston 512. A radius R of the wall of the piston 512 at the bend portions 547 and at the entrance to the groove 576, can be for example, about 3 mm, and a width W defined between the bend portions 547 and the groove 576 can be, for example, about 25 mm. The groove 576 can have a height H, for example, of about 10 mm. A bolt 552 is coupled to the annulus portion 578 to clamp and hold the attachment bead 543 within the groove 576. As with the cylinder 510, an interference fit on the clamping of the attachment bead 543 in the direction of a longitudinal axis of the bolt 552 can be provided, and the rolling seal member 570 can act as an o-ring to seal the clamping area.

In this embodiment, the rolling seal member 570 defines an interior region 572 configured to receive a pressurized fluid, such as a gas or liquid, that can be pumped or otherwise introduced into the interior region 572 to maintain a desired shape and pressure within the interior region 572 of the rolling seal member 570. In some embodiments, the fluid can be, for example, pressurized to a pressure (e.g. 1 bar) above the maximum pressure of the compressor device 500. As shown in FIGS. 8a and 8b, a source or supply of pressurized fluid 518 can be coupled to a supply line 525 in fluid communication with the interior region 572 of the rolling seal member 570. As shown in FIG. 10, a passageway 580 having a diameter D is defined through the annulus portion 554 of the cylinder 510. In some embodiments, the annulus portion 554 can include an insert member 555 that defines the passageway 580 as shown in FIG. 10. In some embodiments, the passageway 580 is defined through a portion of the wall of the cylinder 510. The supply line 525 can be coupled to and in fluid communication with the passageway 580. A valve (not shown) can be, for example, coupled between the interior region 572 and the source of pressurized fluid 518 and can be used to open or close fluid communication with the interior region 572. In some embodiments, the pressurized fluid is introduced into the interior region 572 and the rolling seal member 570 is closed such that there is no flow of the pressurized fluid in or out of the rolling seal member 570 once it is closed. In some embodiments, a flow of pressurized fluid is provided within the interior region 572 of the rolling seal member 570. In some embodiments, the rolling seal member 570 can include a mechanism to allow a small amount of the pressurized fluid to escape or leak from the rolling seal member 570.

As with previous embodiments, the rolling seal member 570 can move or roll with the movement of the piston 512 and maintain a fluid-tight seal between the piston 512 and the cylinder 510. The rolling seal member 570 can be moved between a first configuration in which the rolling seal member 570 is disposed at a first location within the cylinder 510 when the piston 512 is disposed in a first position or location within the cylinder 510 as shown in FIG. 8a, and a second configuration in which the rolling seal member 570 is disposed at a second location within the cylinder 510 when the piston 512 is disposed in a second position or location within the cylinder 510 as shown in FIG. 8b.

In use, the piston 512 can be actuated or moved within the cylinder 510 to compress a gas, such as air, within the cylinder 510. In this embodiment, the compressor device 500 is double-acting in that the piston 512 can be actuated to move or compress air in two directions. As described above for the compressor 400, with the valve 534 at the inlet 524 open and the valve 534 at the outlet 526 closed, a gas (e.g., air) having a first pressure can be introduced into the first interior region 528 via the inlet 524. The valve 534 at the inlet 524 can then be closed and the valve 534 at the outlet 526 can be opened. The piston 512 can be actuated in the direction of arrow A as shown in FIG. 8a, to move or displace the gas out of the first interior region 528 and into the outlet 526. The air moving out of the first interior region 528 will have a second pressure greater than the first pressure of the air when it entered the first interior region 528. Simultaneously, as the piston 512 moves in the direction of arrow A, the valve 534 at inlet 560 can be open and the valve 534 at outlet 562 can be closed, such that air having a first pressure can be introduced or drawn into the second interior region 530 via inlet 560. The valve 534 at the inlet 560 can then be closed and the valve 534 at the outlet 562 can be opened. The piston 512 can then be actuated to move in the direction of arrow B as shown in FIG. 8b to move or compress the air in second interior region 530 as it is moved out of the second interior region 530 and into the outlet conduit 562. The air moving out of the second interior region 530 will have a second pressure greater than the first pressure of the air when it entered the second interior region 530. As the air is moved out of the second interior region 530, air can be introduced into the first interior region 528 via the inlet 524. This cycle can continue as the piston 512 is moved back and forth within the cylinder 510.

Figure 12:
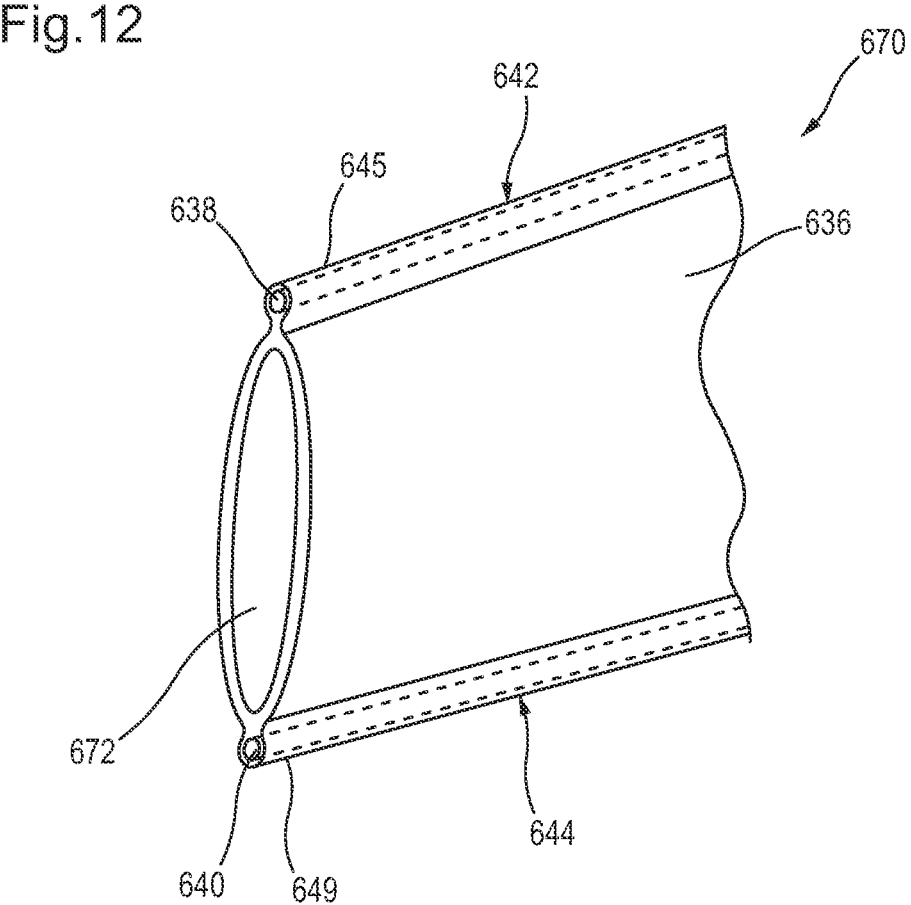
FIG. 12 is a perspective view of a portion of a rolling seal according to another embodiment.
Figure 13:
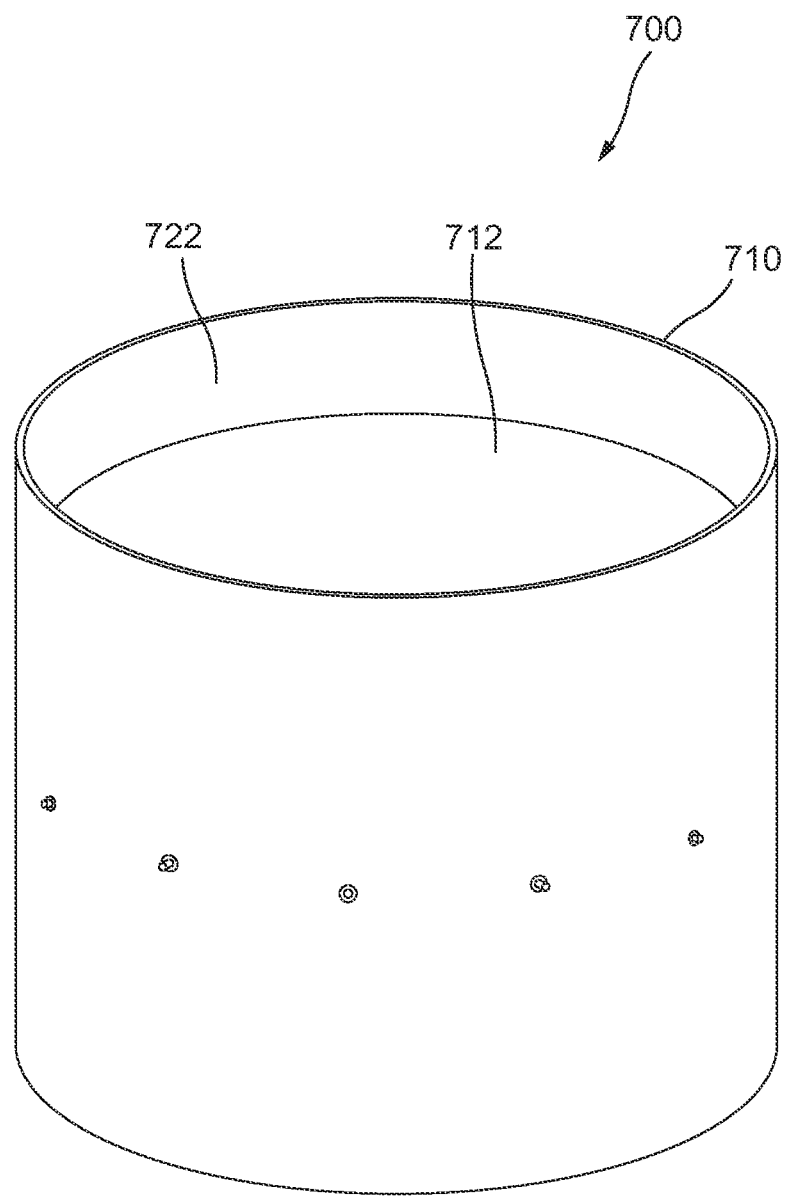
FIG. 13 is a perspective view of a portion of a compressor device according to another embodiment.

In alternative embodiments, a rolling seal member can be provided that is configured or formed as an enclosed bag as shown in FIG. 12. In this embodiment, a rolling seal member 670 includes a circumferential sheet portion 636 that defines an enclosed interior region 672, an attachment bead 642 and an attachment bead 644. The sheet 636 can be formed with similar materials and configured similar to the rolling seal members described herein (e.g., 114, 214, 314, 414, 415, 570). The attachment beads 642 and 644 can each be configured similar to, for example, the attachment bead 543 described above. For example, the sheet portion 636 can have a folded portion 545 surrounding a rod 638 and a folded portion 649 over a rod 640. The rolling seal member 670 can be coupled to a piston and to a cylinder using the attachment beads 642 and 644 as described, for example, for attachment bead 543.

FIGS. 13-18 illustrate a portion of an embodiment of a compressor device that includes a rolling seal member that is formed as an enclosed bag that defines an interior region. A compressor device 700 includes a cylinder or pressure vessel 710, a piston 712 movably disposed within an interior region 722 of the cylinder 710, and a rolling seal member 770 (see, e.g., FIGS. 14 and 15). The rolling seal member 770 is movably disposed within the interior region 722 between the piston 712 and an interior wall of the cylinder 710. The compressor device 700 can be configured to compress a gas, such as air, within the cylinder 710 as described above for previous embodiments. Although not shown in FIGS. 13-18, the compressor device 700 can also include one or more inlet ports and one or more outlet ports as described above for previous embodiments.

Figure 14:
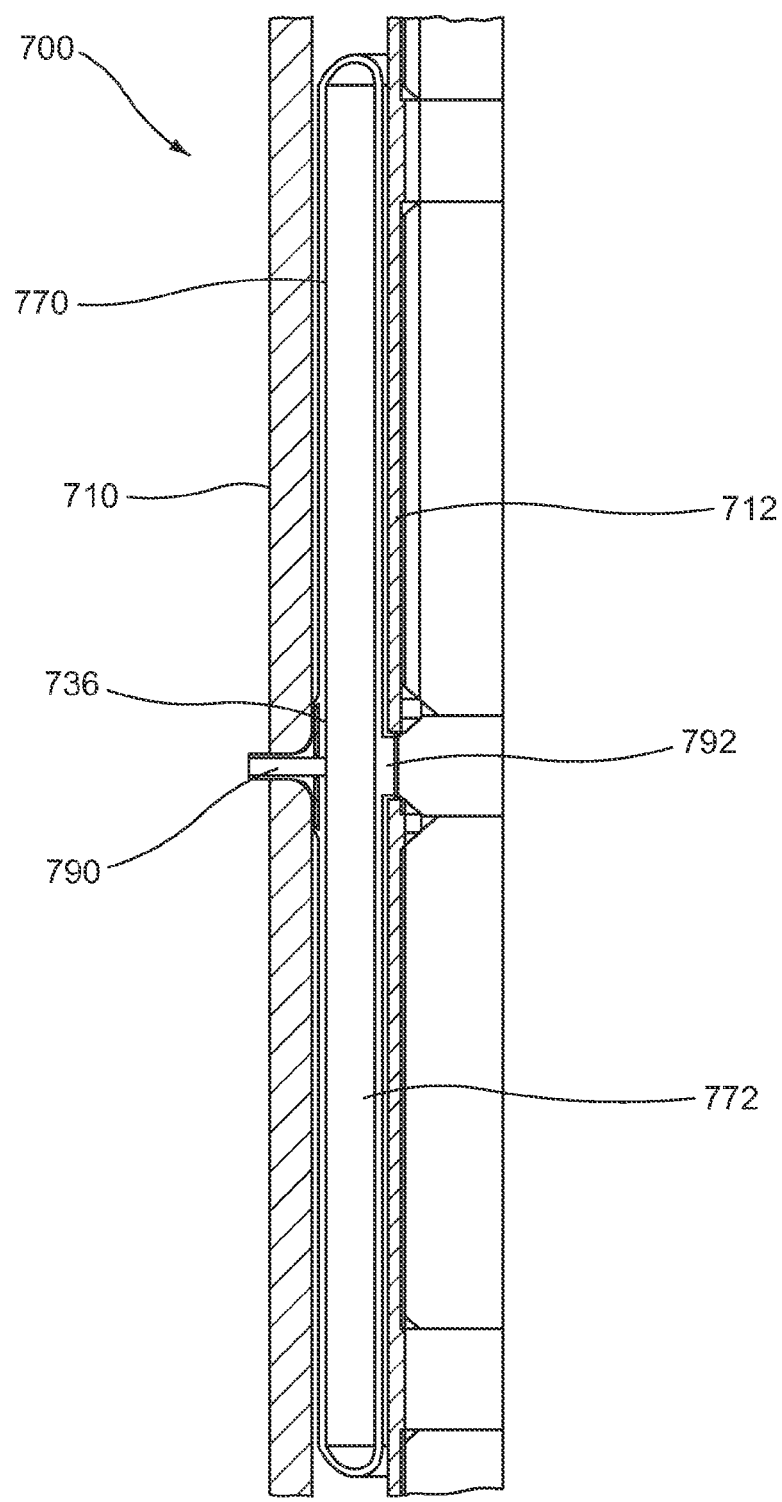
FIG. 14 is a cross-sectional view of the portion of the compressor device of FIG. 13.
Figure 15:
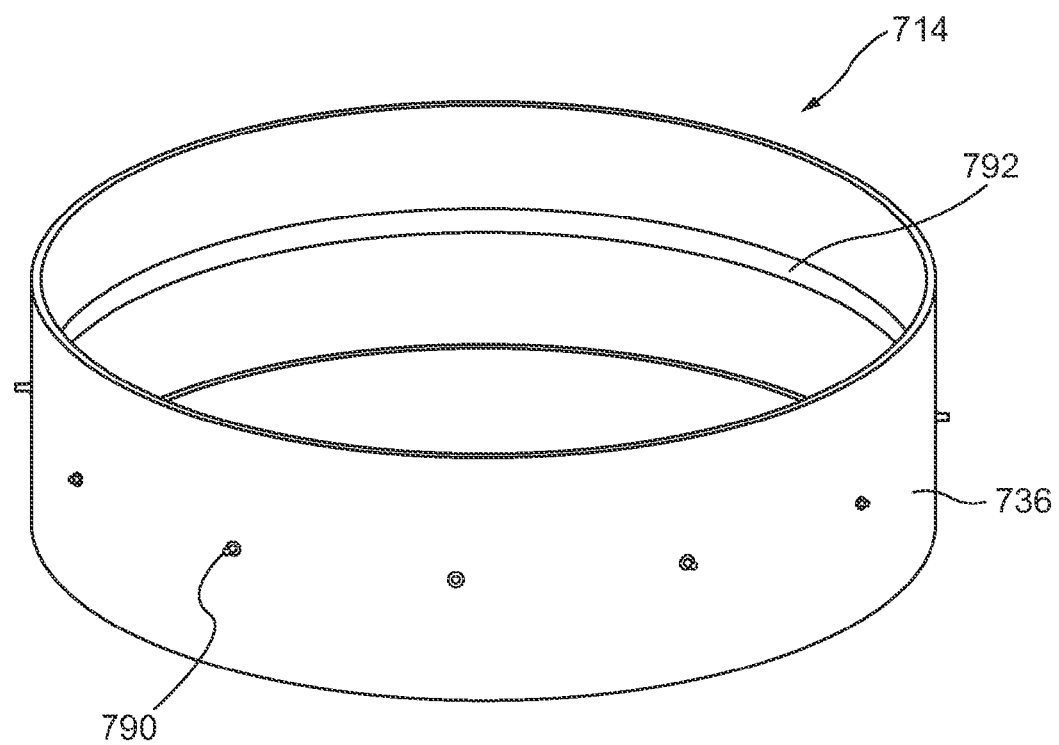
FIG. 15 is a perspective view of a rolling seal member of the compressor device of FIG. 13.

As shown in FIGS. 14 and 15, the rolling seal member 770 includes a circumferential or circular sheet 736 that that defines an interior region 772 (as shown in FIG. 14). The interior region 772 can be configured to receive a fluid (e.g., a gas or liquid) as described above for previous embodiments. In some embodiments, the interior region 772 can receive a pressurized fluid. In this embodiment, the rolling seal member 770 includes multiple pins 790 disposed about an exterior surface of the circumferential sheet portion 736 that can be used to couple the rolling seal member 770 to the cylinder 710. The pins 790 can be coupled to the sheet portion 736 or embedded or molded within the material of the sheet portion 736, or formed integrally or monolithically with the sheet portion 736. The rolling seal member 770 also includes an interior rib member 792 that can be used to couple the rolling seal member 770 to the piston 712.

Figure 16:
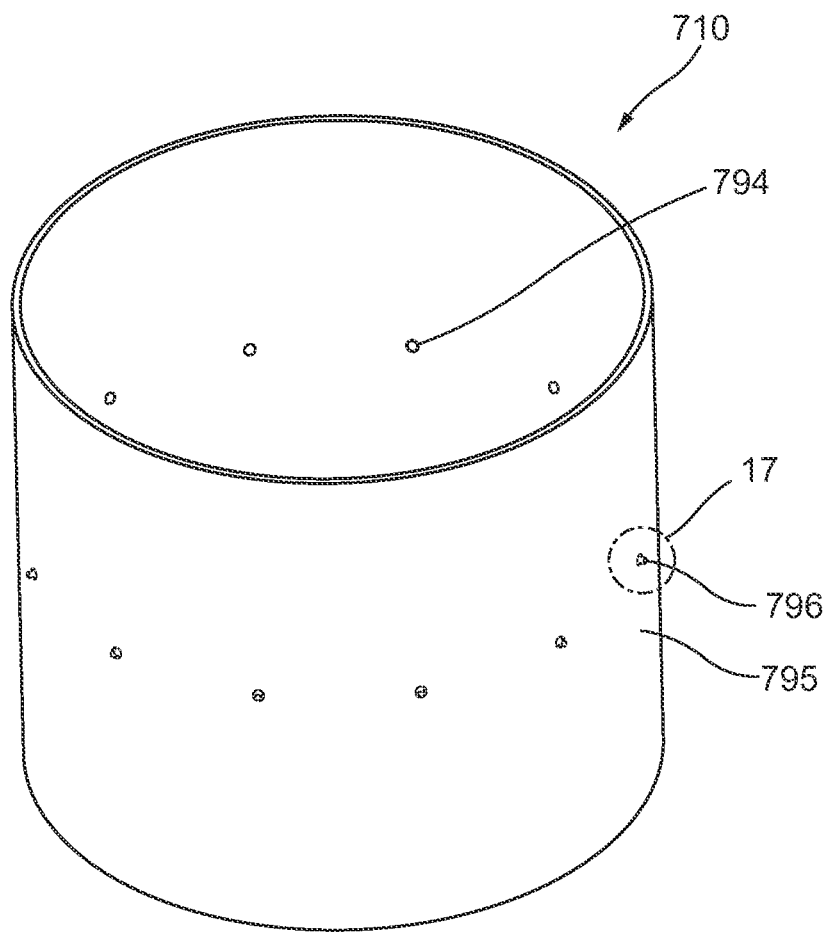
FIG. 16 is a perspective view of a pressure vessel of the compressor device of FIG. 13.
Figure 17:
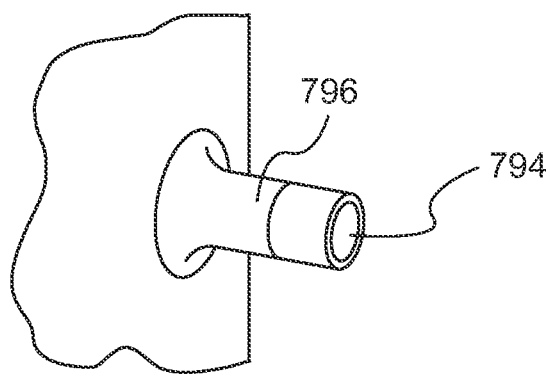
FIG. 17 is an enlarged view of the portion of FIG. 16 identified in FIG. 16 by the line 17.

As shown in FIGS. 16 and 17, the cylinder 710 includes multiple openings 794 defined through a wall 795 of the cylinder 710, and protrusions 796 that extend outward from the wall 795 as shown in more detail in FIG. 17. The protrusions 796 each define a passage or lumen 797 that is in fluid communication with the corresponding openings 794. As shown in FIG. 16, the openings 794 are disposed circumferentially around the cylinder wall 795 at locations configured to correspond to the circumferentially disposed pins 790 of the rolling seal member 770, such that the pins 790 of the rolling seal member 770 can be received through the openings 794 and the passages 797 of the protrusions 796. The pins 790 can be coupled thereto with a friction fit to the protrusions 796. In alternative embodiments, the cylinder 710 does not include protrusions 796. In such an embodiment, the cylinder 710 can define openings through a wall of the cylinder 710 and the pins 790 can be received therethrough, and a nut or other mechanism can be used to secure the pins 790 to the cylinder 710.

Figure 18:
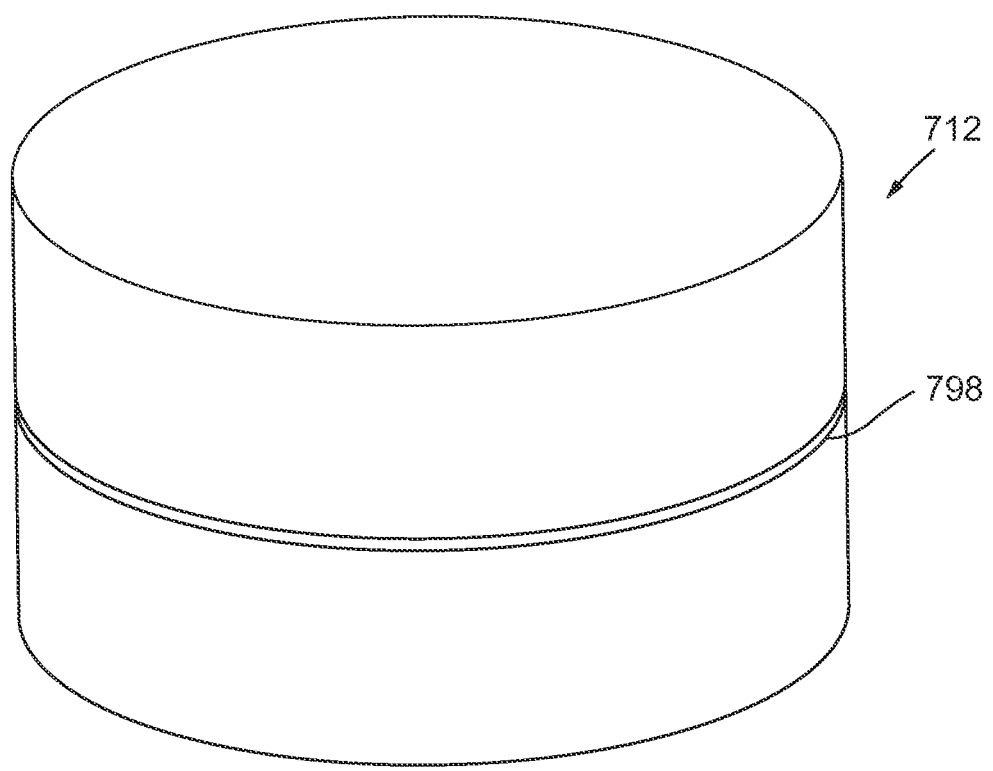
FIG. 18 is a perspective view of a piston of the compressor device of FIG. 13.

As shown in FIG. 18, the piston 712 includes a circumferential groove 798 defined in an outer wall portion of the piston 712 that can receive therein the rib 792 of the rolling seal member 770. Thus, as shown in FIG. 14, the rolling seal member 770 can be disposed between the piston 712 and the cylinder 710. During actuation of the compressor device 700, as the piston 712 moves relative to the cylinder 710, the rolling seal member 770 can move with the piston 712.

Figure 19:
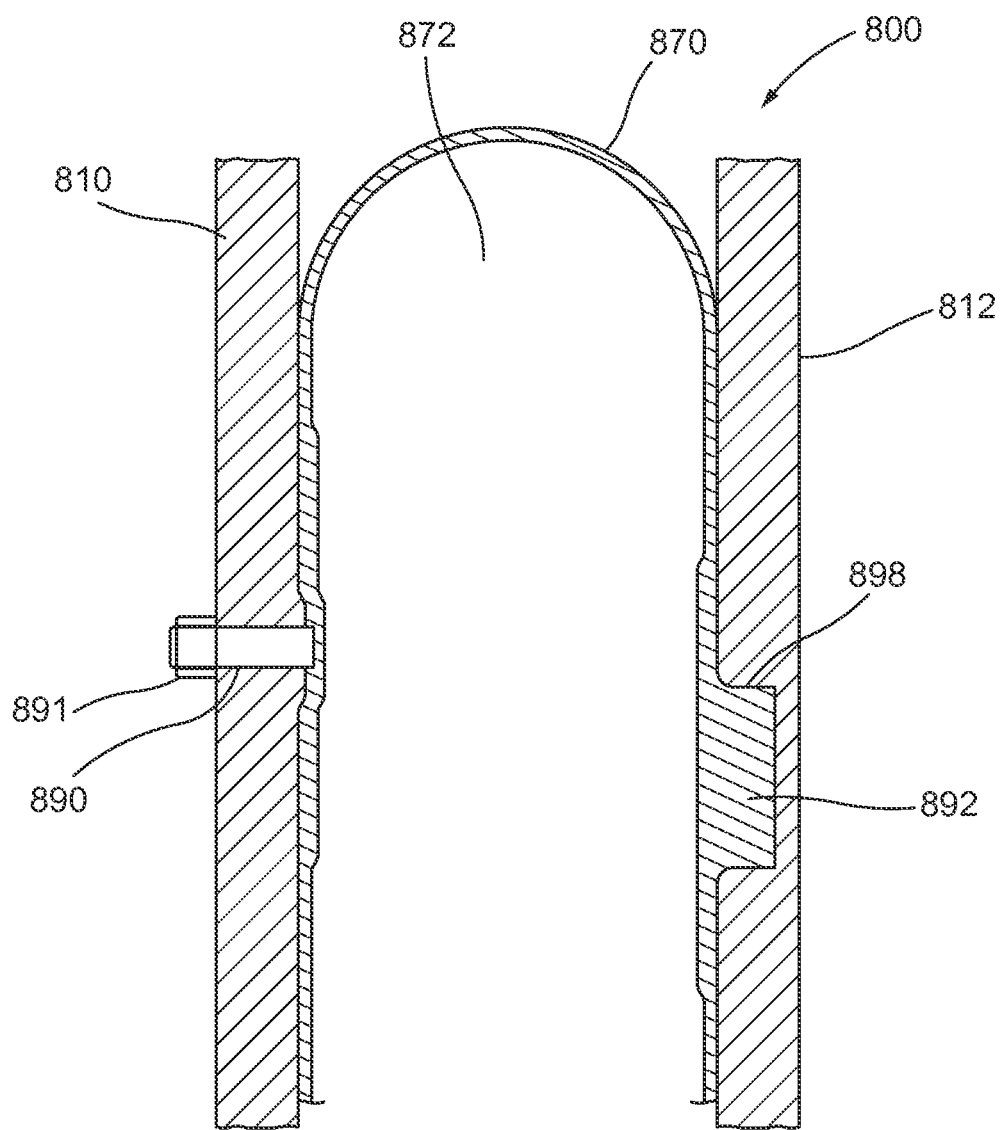
FIG. 19 is a cross-sectional view of a portion of a compressor device according to another embodiment.

FIG. 19 illustrates a portion of an embodiment of a compressor device 800 that includes a rolling seal member 870 that is formed as an enclosed bag defining an interior region 872 similar to the rolling seal member 770. In this embodiment, the rolling seal member 870 can include multiple pins 890 that can extend through corresponding openings 894 of the cylinder 810 (only one pin 890 and opening 894 are shown in FIG. 19) and the pins 890 include a threaded portion that can be secured with a nut 891 on the outside of the cylinder 810. The rolling seal member 870 also includes a rib member 892 that can be coupled within a groove 898 defined in an outer wall portion of a piston 812 in a similar manner as described above for rolling seal member 770.

Figure 20:
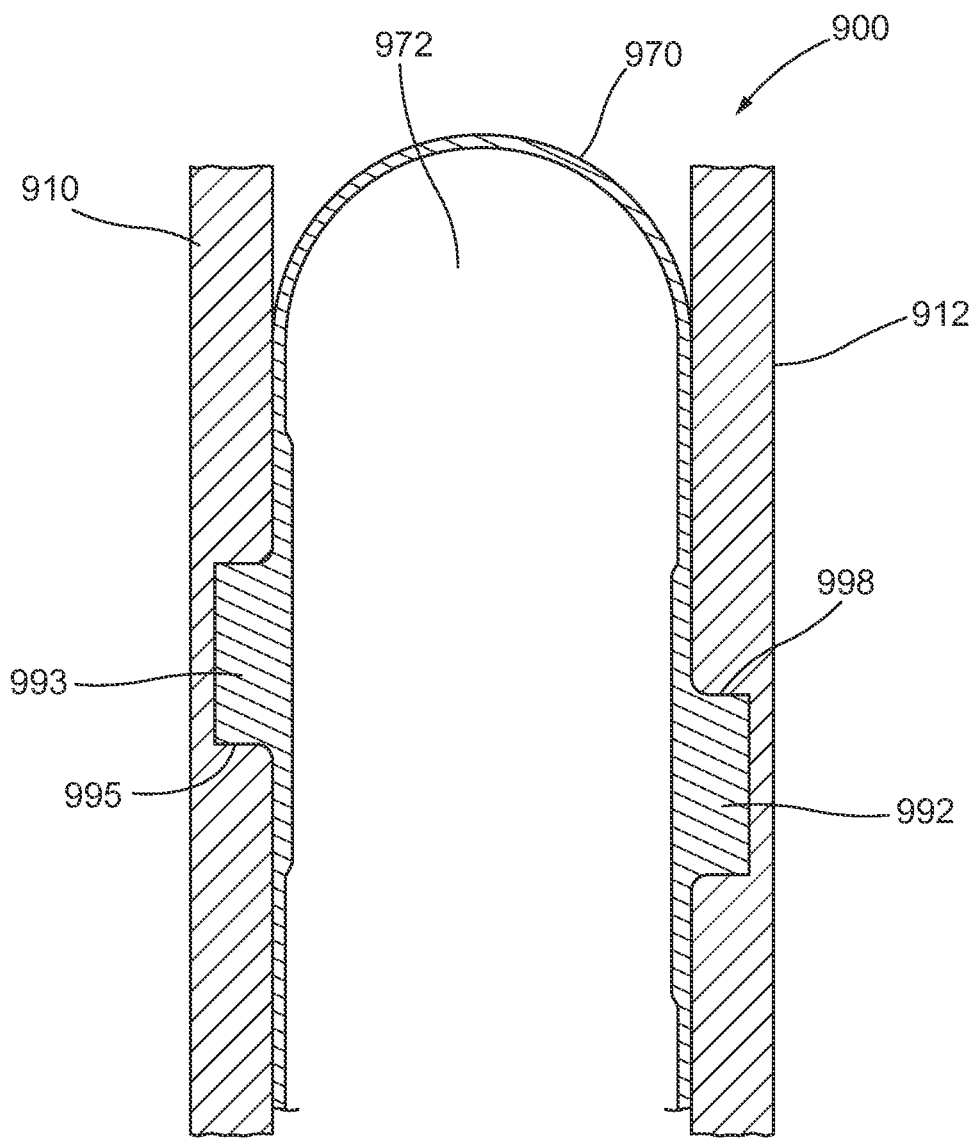
FIG. 20 is a cross-sectional view of a portion of a compressor device according to another embodiment.

FIG. 20 illustrates a portion of another embodiment of a compressor device 900 that includes a rolling seal member 970 that is formed as an enclosed bag defining an interior region 972 similar to the rolling seal members 770 and 870. The interior region 972 can receive therein a fluid as described above. In this embodiment, the rolling seal member 970 can include a rib 993 configured to be received within a groove 995 defined in a wall of a cylinder 910 and a rib 992 configured to be received within a groove 998 defined in a piston 912.

Figure 21:
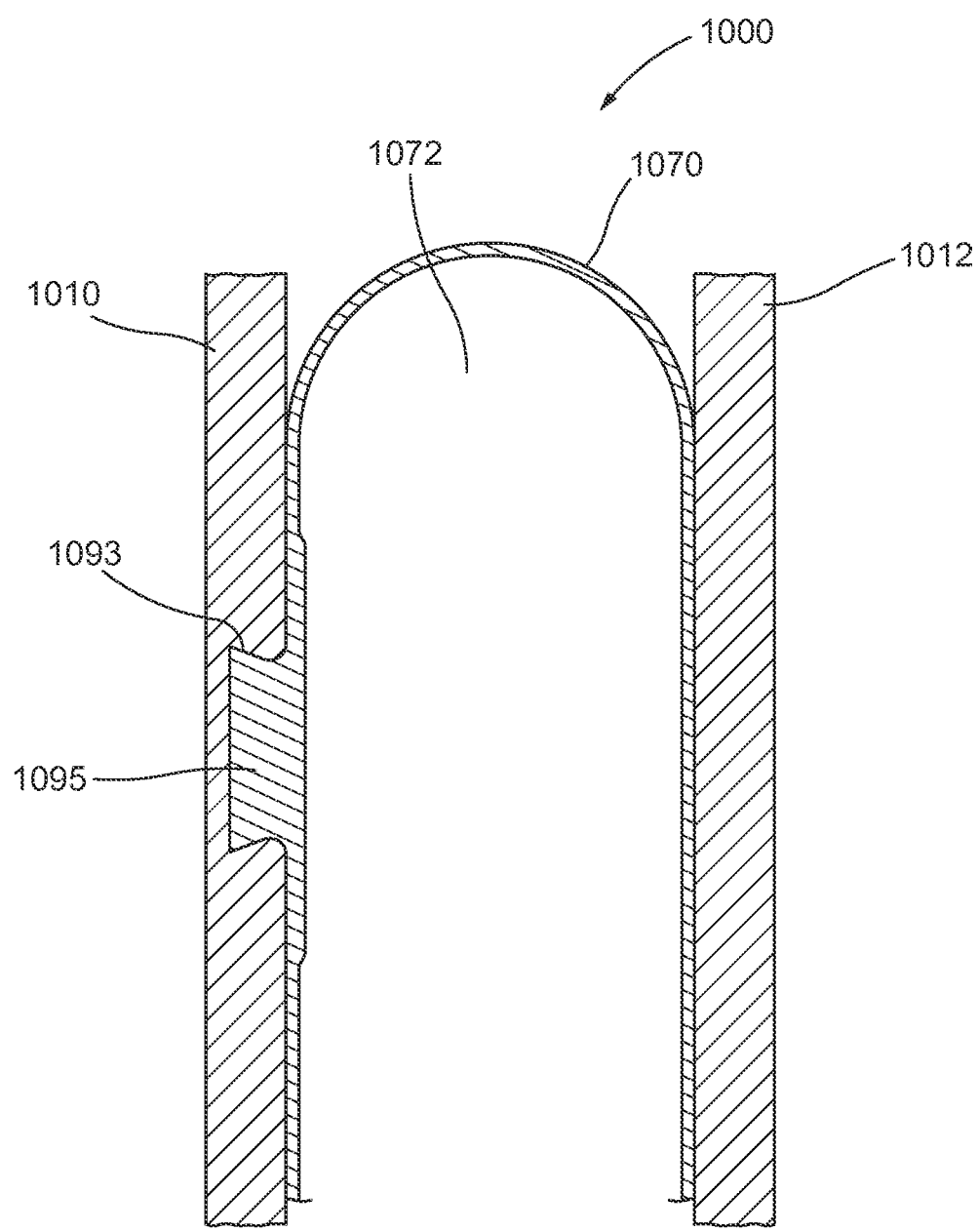
FIG. 21 is a cross-sectional view of a portion of a compressor device according to another embodiment.

FIG. 21 illustrates a portion of another embodiment of a compressor device 1000 that includes a rolling seal member 1070 that is formed as an enclosed bag defining an interior region 1072 similar to the rolling seal members 770, 870 and 970. The interior region 1072 can receive therein a fluid as described above. In this embodiment, the rolling seal member 1070 can include a first rib 1093 that has a dovetail shape configured to be received within a mating dovetail shaped groove 1095 defined in a wall of a cylinder 1010. The rolling seal member 1070 can also include a second rib (not shown) that can be received within a mating groove (not shown) defined in a piston 1012. The second rib can be dovetail shaped as with the rib 1093 or can be shaped similar to the ribs 993 and 992, or can have another shape not shown.

Figure 22:
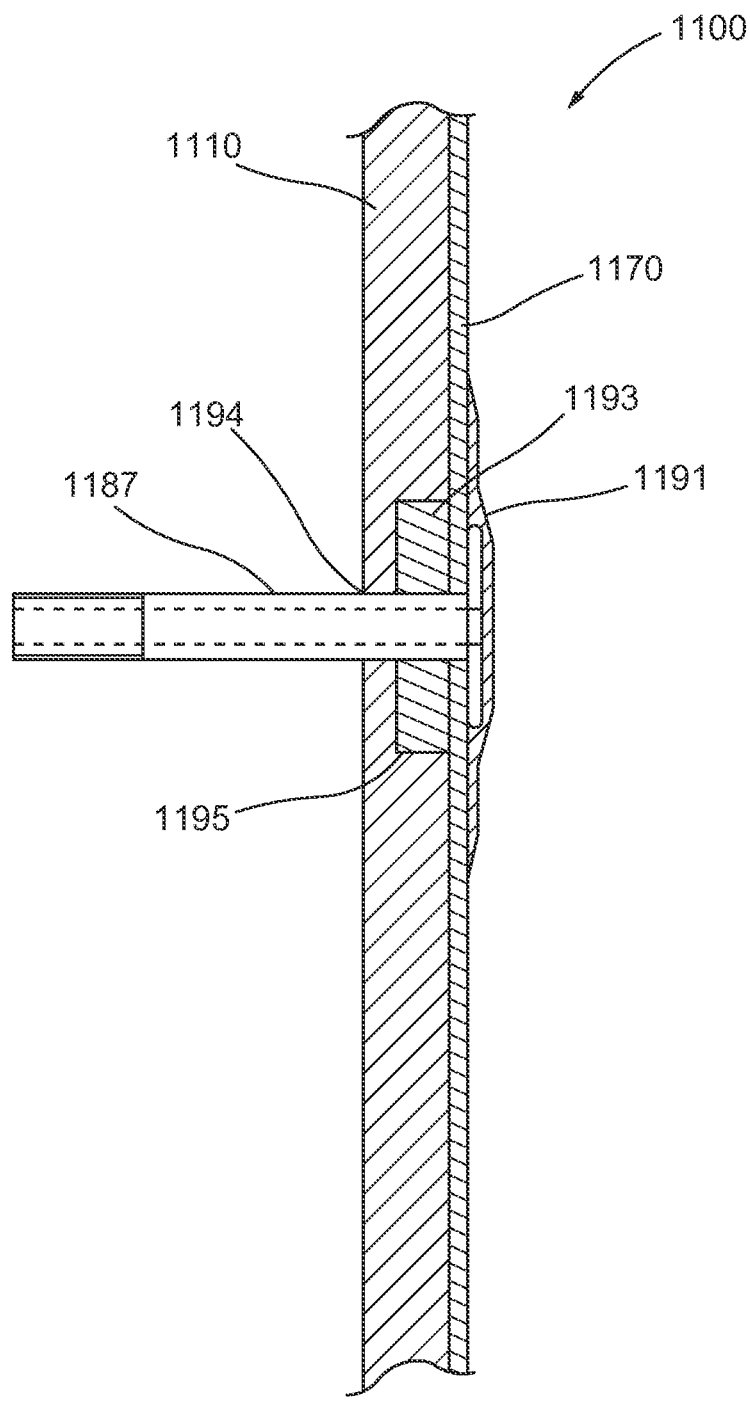
FIG. 22 is a cross-sectional view of a portion of a compressor device according to another embodiment.

FIG. 22 illustrates a portion of another alternative embodiment of a compressor device 1100 that includes a rolling seal member 1170 that is formed as an enclosed bag defining an interior region 1172. The interior region 1172 can receive therein a fluid as described above. In this embodiment, the rolling seal member 1170 includes a rib 1193 that can be received within a groove 1195 defined along an interior wall of a cylinder 1110 and a valve pin 1187 that can be inserted through an opening defined through the wall of the cylinder 1110. The valve pin 1187 can be used to inflate the interior region 1172 of the rolling seal member 1170 with a fluid, such as a gas or a liquid. In some embodiments, the valve pin 1187 can be used to inflate the rolling seal member 1170 with air. The valve pin 1187 can include, for example, a one way valve, or a valve that can be opened and closed, to allow for inflation of a fluid into the interior region 1172. The rolling seal member 1170 can also include an attachment mechanism (not shown) used to couple the rolling seal member 1170 to a piston (not shown) as described above for previous embodiments. A cap (not shown can be included to cover the end of the valve pin 1187.

In this embodiment, the rolling seal member 1170 also includes a strengthening member 1191 disposed on an inside wall portion of the rolling seal member 1170. The strengthening member 1191 can be, for example a strap that extends across the interior diameter of the rolling seal member 1170. In some embodiments, the strengthening member 1191 can be a single or separate insert disposed within the rolling seal member 1170 at each of the regions where there is a valve pin 1187.

The compressor devices (e.g., 100, 200, 300, 400, 500, 700) described herein can be used for a variety of different functions. In one example use, a compressor device as described herein can be used within a compressed air energy storage (CAES) system as described, for example, in the Compressor and/or Expander Device applications incorporated by reference above. The compressor devices (e.g., 100, 200, 300, 400, 500, 700) described herein can also be configured to expand a gas (e.g., air). The below example illustrates a two stage compression/expansion system that includes a compressor device as described herein. It should be understood, however, that the compressor devices described herein can be used in a variety of different types of CAES systems having any number of compression and expansion stages.

Figure 23:
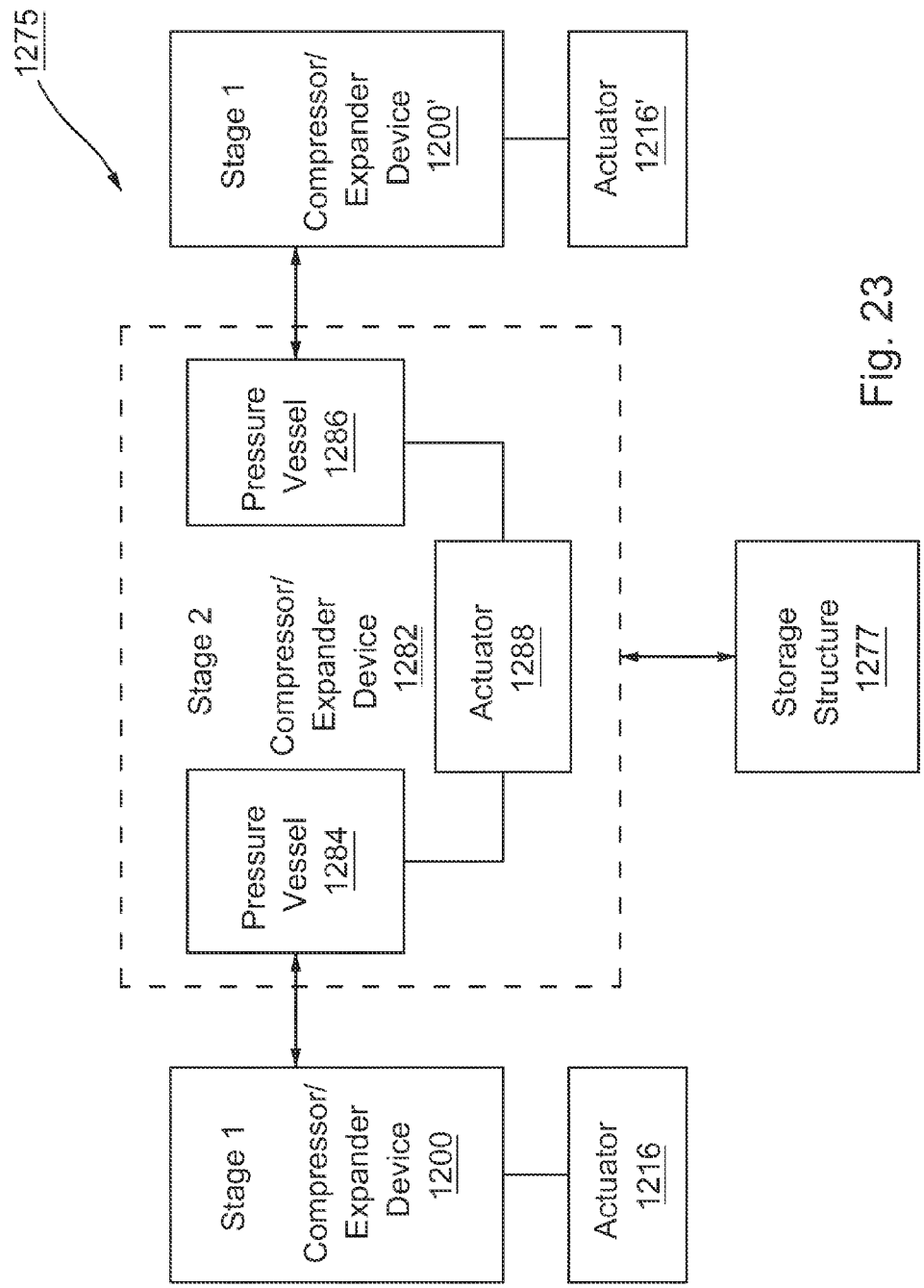
FIG. 23 is a schematic illustration of a compressor/expander system according to an embodiment.

FIG. 23 is a schematic illustration of a CAES system that includes a compressor device as described herein. The CAES system 1275 includes compressor/expander devices arranged in series to create multi-stages of compression and expansion of gas (e.g., air). The first stage includes a compressor/expander device 1200 and a compressor/expander device 1200', and the second stage includes a compressor/expander device 1282.

The compressor/expander device 1200 and the compressor/expander device 1200' can each be double-acting and configured similar to or the same as, for example, compressor device 400 or compressor device 500 described herein. The compressor/expander device 1200 can be coupled to an actuator 1216, and the compressor/expander device 1200' can be coupled to an actuator 1216'. The actuator 1216 and the actuator 1216' can each be configured to actuate a piston (not shown) disposed within a cylinder or pressure vessel (not shown) of the compressor/expander devices 1200 and 1200', respectively, to move the pistons back and forth within the cylinders, as described above with reference to previous embodiment. In some embodiments, a single actuator (e.g., 1216 or 1216') can be used to actuate both compressor/expander devices 1200 and 1200' simultaneously.

The compressor/expander device 1282 can include a first pressure vessel 1284 and a second pressure vessel 1286, connected in fluid communication to a hydraulic actuator 1288, as described in the Compressor and/or Expander Device applications incorporated by reference above. In other configurations, there could be one, three, four, or more pressure vessels in each stage. The hydraulic actuator 1288 can include a water pump (not shown) that drives a hydraulically driven piston (not shown) disposed within a housing (not shown) and can be driven with one or more hydraulic pumps (not shown) to alternately reduce and then increase the internal air volume within the first pressure vessel 1284 of the compressor/expander device 1282 (with an equivalent, but opposite increase and reduction of air volume in the second pressure vessel 1286 of the compressor/expander device 1282). Each of the pressure vessels 1282 and 1284 are at least partially filled with a liquid, such as water, that is moved by the actuator 1288 to alternately compress and drive air from the volume of each of the pressure vessels, when operated in a compression mode, or to be moved by compressed air received in either of the pressure vessels when operated in an expansion mode.

Each of the compressor/expander device 1200 and 1200' can be coupled to a source of air and the compressor/expander device 1282 can be fluidly coupled to a storage structure 1277. In use, to compress air for storage, air can enter the CAES system 1275 at the first stage, be compressed and moved to the second stage for further compression before being moved to the storage structure 1277. During the compression process, heat can be removed from the air by various heat removal or transfer methods, as described, for example, in the Compressor and/or Expander Device applications incorporated herein. At a subsequent time, compressed air may be released from the storage structure 1277 and expanded through the second stage, moved to the first stage where it is further expanded, and eventually provided to, for example, an actuator (not shown) that drives a motor/alternator (not shown) to produce electricity. Heat at a relatively low temperature (e.g., between for example, about 10° C. and about 50° C.) may be added to the air during expansion to increase the power generated during the expansion process.

More specifically, air can be drawn into a first interior region of a cylinder of the compressor/expander device 1200, while simultaneously air within the second internal region of the cylinder of the compressor/expander device 1200 is compressed as described herein. The compressed air is moved to the first pressure vessel 1284 of the compressor/expander device 1282 where it is further compressed before being transferred to the storage structure 1277. Similarly, air can be drawn into a first interior region of the compressor/expander device 1200', while simultaneously air within the second internal region of the compressor/expander device 1200' is compressed as described herein. The compressor/expander devices 1200 and 1200' can be configured to work in cooperation with the alternating compression cycles of the first pressure vessel 1284 and the second pressure vessel 1286 of the compressor/expander device 1282. The process can work in reverse to expand compressed air from the storage structure 1277 as described above.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. For example, although certain embodiments of a rolling seal member were shown and described with respect to a single-acting or a double-acting compressor device, it should be understood that the various embodiments of a rolling seal member may be used in either a single-acting or a double-acting compressor device.

In another example, any of the attachment methods for attaching a rolling seal member to a piston and/or a cylinder described herein can be used in any embodiment of a compressor device to attach the rolling seal member to either or both of the piston and cylinder. For example, a rolling seal member can include any combination of attachment methods to couple the rolling seal member to a piston and cylinder of a compressor device. In some embodiments, the same attachment method can be used for both the piston and the cylinder (e.g., a rib and groove). In some embodiments, different attachment methods can be used (e.g., a rib and groove and a pin through an opening). The specific configurations of the various components can also be varied. For example, the size and specific shape of the various components can be different than the embodiments shown, while still providing the functions as described herein.

What is claimed is:

1. An apparatus suitable for use in a compressed-gas-based energy storage and recovery system, the apparatus comprising:
   a pressure vessel defining an interior region in which at least one of a liquid and a gas can be contained;
   a piston movably disposed within the interior region of the pressure vessel, the piston dividing the interior region into a first interior region on a first side of the piston and a second interior region on a second, opposite side of the piston, each of the first and second interior regions including a fluid inlet and a fluid outlet; and
   a seal member comprising a rib, the seal member attached to the piston by the rib and a mating groove defined in an outer wall of the piston and attached to the pressure vessel at at least one end of the seal member, the seal member configured to move between a first configuration in which at least a portion of the seal member is disposed at a first position within the pressure vessel when the piston is in its first position, and a second configuration in which the at least a portion of the seal member is disposed at a second position within the pressure vessel when the piston is in its second position.

2. The apparatus of claim 1, wherein the piston is configured to move in a first direction within the pressure vessel such that gas is received in the first interior region at a first pressure and gas is discharged from the second interior region at a second pressure, and a second direction opposite the first direction such that the gas in the first interior region is discharged from the first interior region at a third pressure and gas is received within the second interior region at a fourth pressure, the third pressure being greater than the first pressure and the second pressure being greater than the fourth pressure.

3. The apparatus of claim 1, wherein the seal member defines a seal interior region configured to receive a fluid.

4. The apparatus of claim 3, further comprising:
   a conduit coupled to and in fluid communication with the seal interior region and configured to communicate pressurized fluid to the seal interior region.

5. The apparatus of claim 1, wherein the seal member is a first seal member, the apparatus further comprising:
   a second seal member attached to the piston and attached to the pressure vessel, the second seal member configured to move between a first configuration in which at least a portion of the second seal member is disposed at a first position within the pressure vessel when the piston is in its first position, and a second configuration in which the at least a portion of the second seal member is disposed at a second position within the pressure vessel when the piston is in its second position.

6. The apparatus of claim 5, wherein the first seal member, the second seal member and the piston collectively define a seal interior region.

7. The apparatus of claim 6, further comprising:
a vacuum source; and
a manifold coupled to the vacuum source and coupled to and in fluid communication with the seal interior region, the vacuum source configured to create a vacuum in the seal interior region.

8. An apparatus suitable for use in a compressed-gas-based energy storage and recovery system, the apparatus comprising:
a pressure vessel defining an interior region in which at least one of a liquid and a gas can be contained;
a piston movably disposed within the interior region of the pressure vessel, the piston being movable between a first position and a second position within the interior region of the pressure vessel; and
a seal member comprising a rod forming a bead, the seal member attached to the piston and attached to the pressure vessel by clamping the bead thereto, the seal member defining a seal interior region configured to contain a pressurized fluid, the seal member configured to move between a first configuration in which at least a portion of the seal member is disposed at a first position within the pressure vessel when the piston is in its first position, and a second configuration in which at least a portion of the seal member is disposed at a second position within the pressure vessel when the piston is in its second position.

9. The apparatus of claim 8, wherein the piston divides the interior region into a first interior region on a first side of the piston and a second interior region on a second opposite side of the piston,
the piston being configured to move in a first direction within the pressure vessel such that gas is received in the first interior region at a first pressure and gas is discharged from the second interior region at a second pressure, and a second direction opposite the first direction such that the gas in the first interior region is discharged from the first interior region at a third pressure and gas is received within the second interior region at a fourth pressure, the third pressure being greater than the first pressure and the second pressure being greater than the fourth pressure.

10. The apparatus of claim 8, wherein the piston divides the interior region into a first interior region on a first side of the piston and a second interior region on a second opposite side of the piston,
when the piston is in its first position gas having a first pressure is disposed within the first interior region and the first interior region has a volume greater than a volume of the second interior region, and when the piston is in its second position gas having a second pressure is disposed within the second interior region and the second interior region has a volume greater than a volume of the first interior region.

11. The apparatus of claim 8, further comprising:
a conduit coupled to and in fluid communication with the seal interior region and configured to communicate pressurized fluid to the seal interior region.

12. The apparatus of claim 8, wherein the seal member is formed as an enclosed bag to contain pressurized fluid.

13. The apparatus of claim 8, wherein the seal member is a first seal member, the apparatus further comprising:
a second seal member attached to the piston and attached to the pressure vessel, the second seal member configured to move between a first configuration in which at least a portion of the second seal member is disposed at a first position within the pressure vessel when the piston is in its first position, and a second configuration in which at least a portion of the second seal member is disposed at a second position within the pressure vessel when the piston is in its second position.

14. An apparatus suitable for use in a compressed-gas-based energy storage and recovery system, the apparatus comprising:
a pressure vessel defining an interior region in which at least one of a liquid and a gas can be contained;
a piston movably disposed within the interior region of the pressure vessel, the piston being movable between a first position and a second position within the interior region of the pressure vessel; and
a seal member having a first portion coupled to the piston and a second portion coupled to the pressure vessel such that at least a portion of the seal member is disposed between the pressure vessel and the piston, the seal member defining a seal interior region and having a cross-section defining a closed loop, the seal member including a valve pin configured to be received within an opening defined in the pressure vessel, the valve pin configured to inflate the interior region of the seal member with a fluid,
the first portion of the seal member configured to move relative to the cylinder when the piston moves between its first position and its second position.

15. The apparatus of claim 14, wherein the seal interior region of the seal member is configured to receive a pressurized fluid.

16. The apparatus of claim 14, wherein the seal member includes multiple pins configured to be received within openings defined by the pressure vessel.

17. The apparatus of claim 14, wherein the seal member includes a rib member configured to be received within a groove defined in the piston.

18. The apparatus of claim 14, wherein the seal member includes a first rib and a second rib, the first rib configured to be received within a groove defined in an interior wall of the pressure vessel, the second rib configured to be received within a groove defined in an outer wall of the piston.

19. The apparatus of claim 14, wherein the piston divides the interior region of the pressure vessel into a first interior region on a first side of the piston and a second interior region on a second opposite side of the piston,
the piston being configured to move in a first direction within the pressure vessel such that gas is received in the first interior region at a first pressure and gas is discharged from the second interior region at a second pressure, and a second direction opposite the first direction such that the gas in the first interior region is discharged from the first interior region at a third pressure and gas is received within the second interior region at a fourth pressure, the third pressure being greater than the first pressure and the second pressure being greater than the fourth pressure.

* * * * *